(12) United States Patent
Blinzer et al.

(10) Patent No.: US 8,487,943 B2
(45) Date of Patent: Jul. 16, 2013

(54) DRIVER ARCHITECTURE FOR COMPUTING DEVICE HAVING MULTIPLE GRAPHICS SUBSYSTEMS, REDUCED POWER CONSUMPTION MODES, SOFTWARE AND METHODS

(75) Inventors: Paul Blinzer, Bellevue, WA (US); Phil Mummah, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1016 days.

(21) Appl. No.: 12/335,258

(22) Filed: Dec. 15, 2008

(65) Prior Publication Data
US 2009/0153540 A1 Jun. 18, 2009

Related U.S. Application Data

(60) Provisional application No. 61/013,527, filed on Dec. 13, 2007.

(51) Int. Cl.
*G06F 15/16* (2006.01)
*G06F 13/14* (2006.01)

(52) U.S. Cl.
USPC ............ 345/504; 345/502; 345/503; 345/520

(58) Field of Classification Search
USPC ................ 345/502–504, 520, 52, 211–213
See application file for complete search history.

(56) References Cited

U.S. PATENT DOCUMENTS

| | | | |
|---|---|---|---|
| 6,624,816 | B1 | 9/2003 | Jones, Jr. et al. |
| 6,760,031 | B1 | 7/2004 | Langendorf et al. |
| 6,850,240 | B1 | 2/2005 | Jones, Jr. et al. |
| 6,864,891 | B2 | 3/2005 | Myers |
| 7,079,149 | B2 | 7/2006 | Main et al. |
| 7,102,645 | B2 | 9/2006 | Chow |
| 7,382,333 | B2 | 6/2008 | Chen et al. |

(Continued)

FOREIGN PATENT DOCUMENTS

| | | |
|---|---|---|
| WO | 9939254 A2 | 8/1999 |
| WO | WO 99/39254 | 8/1999 |

OTHER PUBLICATIONS

Search Report for International Patent Application No. PCT/US2007/069969, filed May 30, 2007.

(Continued)

*Primary Examiner* — Hau Nguyen
(74) *Attorney, Agent, or Firm* — Faegre Baker Daniels

(57) ABSTRACT

Many computing device may now include two or more graphics subsystems. The multiple graphics subsystems may have different abilities, and may, for example, consume differing amount of electrical power, with one subsystem consuming more average power than the others. The higher power consuming graphics subsystem may be coupled to the device and used instead of, or in addition to, the lower power consuming graphics subsystem, resulting in higher performance or additional capabilities, but increased overall power consumption. By transitioning from the use of the higher power consuming graphics subsystem to the lower power consuming graphics subsystem, while placing the higher power consuming graphics subsystem in a lower power consumption mode, overall power consumption is reduced. A processor executes application software and driver software. The driver software includes first and second driver components for respectively controlling operation of the first and second graphics subsystems. A further proxy driver component routes calls (e.g. API/DDI calls) to one of said first and second driver components, in dependence on which of the first and second graphics system is in use.

15 Claims, 14 Drawing Sheets

U.S. PATENT DOCUMENTS

| | | | |
|---|---|---|---|
| 7,420,565 | B2 | 9/2008 | Rubinstein et al. |
| 7,600,222 | B2 | 10/2009 | Wilt et al. |
| 7,698,579 | B2 * | 4/2010 | Hendry et al. ............... 713/300 |
| 7,698,597 | B2 | 4/2010 | Hendry et al. |
| 2001/0032321 | A1 | 10/2001 | Nanno et al. |
| 2005/0198650 | A1 | 9/2005 | Ford et al. |
| 2005/0244131 | A1 | 11/2005 | Uehara |
| 2005/0285863 | A1 | 12/2005 | Diamond |
| 2008/0204460 | A1 | 8/2008 | Marinkovic et al. |

OTHER PUBLICATIONS

Search Report for International Patent Application No. PCT/US2008/086835, filed Dec. 15, 2008.

"About WDK and Developer Tools," Windows Driver Kit, Microsoft Corporation: 2009. Available: <http://www.microsoft.com/whdc/Devtools/wdk/default.mspx>.

"Architecture of the Windows Driver Foundation," Microsoft Corporation, May 10, 2006. Available: <http://www.microsoft.com/whdc/driver/wdf/wdf-arch.mspx>.

Gade, Lisa, "Sony Vaio SZ330—Notebook Reviews by Mobile Tech Review," Oct. 15, 2006. Available: <http://www.mobiletechreview.com/notebooks/Sony-Vaio-SZ330.htm>.

"Introduction to WDM," Windows Driver Kit: Kernel-Mode Driver Architecture, Microsoft Corporation, 2009. Available: <http://msdn2.microsoft.com/en-us/library/aa490246.aspx>.

"Sample Drivers for the Kernel-Mode Driver Framework," Microsoft Corporation, May 10, 2006. Available: <http://www.microsoft.com/whdc/driver/wdf/KMDF-samp.mspx>.

"Windows Vista Display Driver Model," Windows Vista Technical Articles, Microsoft Corporation, Jul. 2006. Available: <http://msdn.microsoft.com/en-us/library/aa480220.aspx>.

"Windows Vista Display Driver Model Referece," Windows Driver Kit, Microsoft Corporation, Aug. 5, 2009. Available: <http://msdn.microsoft.com/en-us/library/ms794244.aspx>.

International Search Report and Written Opinion from European Patent Office; International Application No. PCT/US2008/086835; dated Jun. 16, 2009.

Chinese Office Action; Chinese Application No. 200880126821.2; dated Sep. 26, 2012.

* cited by examiner

DRIVER ARCHITECTURE FOR COMPUTING DEVICE HAVING MULTIPLE GRAPHICS SUBSYSTEMS, REDUCED POWER CONSUMPTION MODES, SOFTWARE AND METHODS

CROSS-REFERENCE TO RELATED APPLICATIONS

This application claims the benefit of U.S. Provisional Application Ser. No. 61/013,527 filed Dec. 13, 2007, entitled "DRIVER ARCHITECTURE FOR COMPUTING DEVICE HAVING MULTIPLE GRAPHICS SUBSYSTEMS, REDUCED POWER CONSUMPTION MODES, SOFTWARE AND METHODS", having as an inventors Phil Mummah and Paul Blinzer, and owned by instant assignee and hereby incorporated by reference in its entirety. This application is also related to U.S. patent application Ser. No. 11/421,005 filed May 30, 2006, and U.S. patent application Ser. No. 11/755,625, filed May 30, 2007, the contents of both of which are hereby incorporated by reference.

FIELD OF THE INVENTION

The present invention relates generally to computing devices, and more particularly to devices having multiple graphics subsystem, and the associated software drivers. As well, in one aspect, the invention is directed to methods for lowering the power consumption in such devices.

BACKGROUND OF THE INVENTION

Many electronic devices, such as conventional computing devices now include graphics subsystems capable of rendering two and three dimensional graphics; decoding and encoding motion video; and the like. To provide these features and desired processing speeds, modern graphics subsystems include an ever increasing number of transistors. Not surprisingly, the increase in transistor counts has led to corresponding higher electric power consumption by the graphics subsystems.

As a consequence, the fastest and most feature-rich graphics subsystems have, for the most part, been reserved for devices that can meet the increased power demands. Portable computing devices, such as laptops, personal digital assistants, video and audio players, cellular telephones, and the like, have often been equipped with functionally limited, but electrically efficient (i.e. lower power) components.

Often these graphics subsystems are integrated in other computing components such as processor interconnect circuits (often referred to as "chipsets").

Recently, there has been a trend to provide graphics features and performance that rival those of stationary computers for portable devices. Often, this is done by allowing the addition of an optional, external high power graphics subsystem to portable devices. The PCI express (PCIe) standard, for example, contemplates interconnection of PCI express compliant graphics cards, including a graphics subsystem, as external components to laptop computing devices.

In the presence of multiple graphics subsystems there is often a desire to switch the computing device's operating state to use one or the other graphics subsystem without restarting (e.g. rebooting) the computing device.

Unfortunately, the software architecture of some operating systems only contemplates use of a single graphics driver. Thus, in the presence of multiple graphics subsystems, this single driver needs to control operation of all of the multiple subsystems. This may be impractical, particularly if the subsystems are provided by different manufacturers.

Accordingly, there remains a need for software and devices that allow use of multiple graphics drivers.

SUMMARY OF THE INVENTION

Many computing device may now include two or more graphics subsystems. The multiple graphics subsystems may have different abilities, and may, for example, consume differing amount of electrical power, with one subsystem consuming more average power than the others. The higher power consuming graphics subsystem may be coupled to the device and used instead of, or in addition to, the lower power consuming graphics subsystem, resulting in higher performance or additional capabilities, but increased overall power consumption. By transitioning from the use of the higher power consuming graphics subsystem to the lower power consuming graphics subsystem, while placing the higher power consuming graphics subsystem in a lower power consumption mode, overall power consumption is reduced.

A processor executes application software and driver software. The driver software includes first and second driver components for respectively controlling operation of the first and second graphics subsystems. A further proxy driver component routes calls (e.g. API/DDI calls) from the application software to one of the first and second driver components, in dependence on which of the first and second graphics system is in use.

Conveniently, this proxy driver component presents a single interface to the operating system and applications, while allowing the use of two separate driver components. The proxy driver component may be a Windows Vista user mode driver (UMD) component and/or a kernel mode driver (KMD) component.

In accordance with an aspect of the present invention, there is provided an electronic device. The electronic device comprises: a first graphics subsystem operable to render graphics; a second graphics subsystem operable to render graphics; at least one display in communication with at least one of the first graphics subsystem and the second graphics subsystem; a processor executing application software and driver software, the driver software comprising first and second driver components for respectively controlling operation of the first and second graphics subsystem, and a proxy driver component for routing calls from the application to one of the first and second driver components, in dependence on which of the first and second graphics system is in use.

In accordance with another aspect of the present invention, there is provided an electronic device comprising: a first graphics subsystem operable to render graphics; a second graphics subsystem operable to render graphics; a display in communication with both the first graphics subsystem and the second graphics subsystem; a processor executing application software and driver software, the driver software comprising first and second user mode driver components for respectively controlling operation of the first and second graphics subsystem, and a user mode proxy driver component for routing calls from the application to one of the first and second user mode driver components, in dependence on which of the first and second graphics system is in use; first and second kernel mode driver components for respectively controlling operation of the first and second graphics subsystem, and a kernel mode proxy driver component for routing calls from one of the user mode driver components to one of the first and second kernel driver components, in dependence on which of the first and second graphics system is in use.

In accordance with yet another aspect of the present invention, there is provided A method of operating an electronic device comprising first and second graphics subsystem operable to render graphics. The method comprises: receiving driver calls from a software application or an operating system executing at the electronic device; routing the driver calls from a software application, to one of first and second software driver components for respectively controlling operation of the first and second graphics subsystem, in dependence on which of the first and second graphics subsystem is in use.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
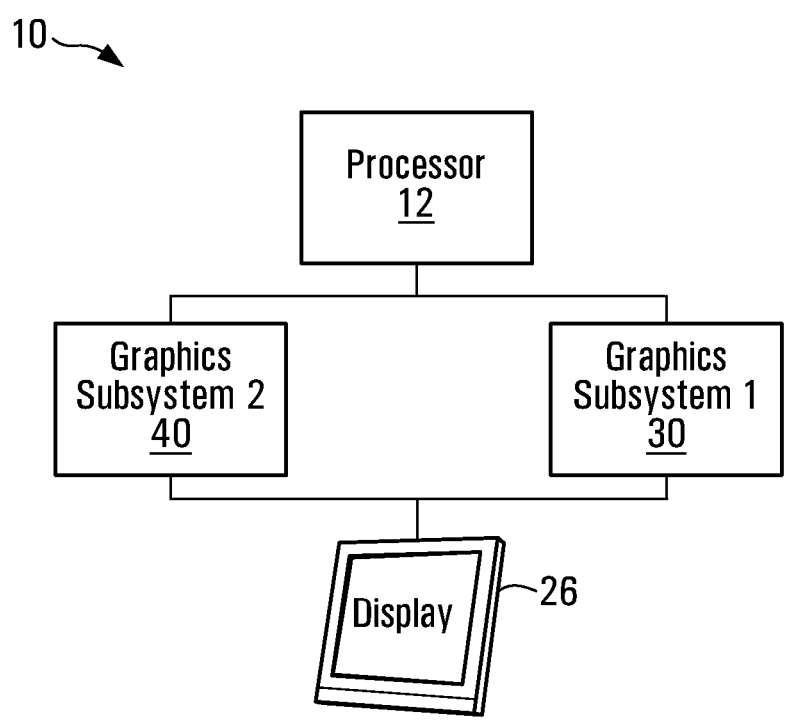
FIG. 1 is a simplified schematic block diagram of a computing device, exemplary of an embodiment of the present invention.

FIG. 1 is a simplified, high level, block diagram of an electronic device 10, including two graphics subsystems 30 and 40 and a display 26. As will become apparent, each graphics subsystem 30, 40 includes specialized electronic circuits capable of rendering computer graphics, in the form of one or more of 2D graphics, 3D graphics, decoded motion video or the like.

One graphics subsystem 40 may consume higher average power than the other graphics subsystem 30. Typically, graphics subsystem 40 consumes the higher average power has greater graphics rendering capability than graphics subsystem 30. Graphics subsystem 40 may, for example, be able to render 2D or 3D graphics at a higher frame rate than the graphics subsystem that consumes the lower average power. Similarly, graphics subsystems 30, 40 need not have identical capabilities. Graphics subsystem 40 typically includes more functional blocks than graphics subsystem 30.

Both graphics subsystem 30 and 40 may be physically or logically coupled to the same display 26, on which rendered graphics are displayed. Exemplary of embodiments of the present invention, device 10 may switch from a higher power consumption mode, in which graphics to display 26 are rendered by higher power consumption graphics subsystem 40 to a lower power mode in which graphics to display 26 are rendered by lower power consumption graphics subsystem 30, and graphics subsystem 40 is partially, completely or substantially disabled.

Conveniently, the transition from the high power mode to the low power mode is effected dynamically, without requiring device 10 to power cycle (i.e. power down and restart), and may be effected by processor 12, under software control. In this context, software may include application software, firmware, device driver, BIOS and the like.

The invention may form part of virtually any electronic device that includes two graphics subsystems. As such, device 10 could take the form of a desktop computing device, a portable computing device (including a laptop computer, PDA, mobile telephone, video or audio player, media center, or the like).

In an exemplified embodiment described below, an embodiment of the invention is disclosed as forming part of a mobile (laptop) computing device.

Figure 2:
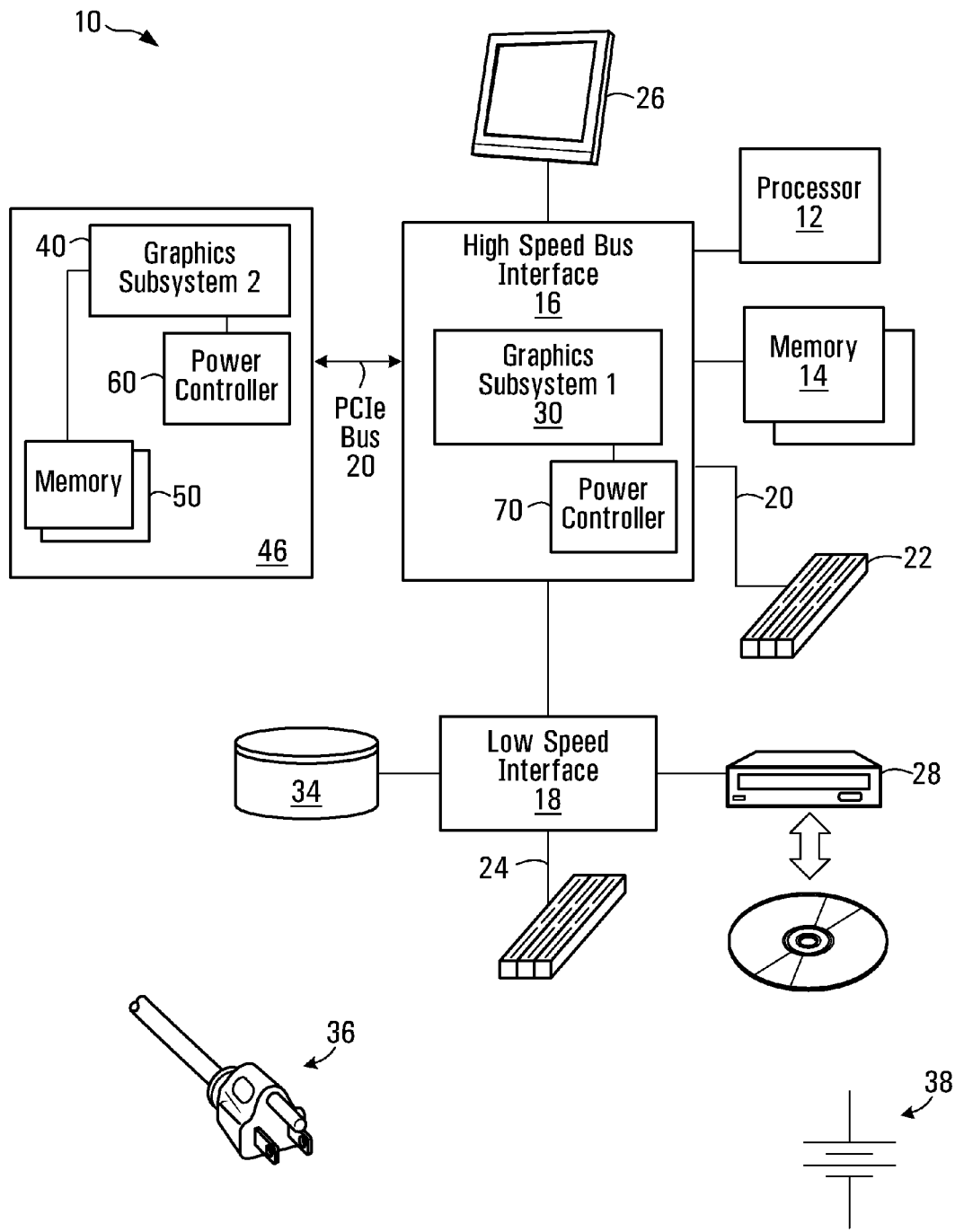
FIG. 2 is a simplified schematic block diagram of a computing device, exemplary of an embodiment of the present invention.

Specifically, FIG. 2 is a simplified block diagram of a specific mobile computing device 10, exemplary of an embodiment of the present invention. Depicted device 10 shown in FIG. 1 is a computing device based on the conventional Intel x86 computer architecture. However, a person of ordinary skill will readily appreciate that the invention may be embodied in computing devices having other architectures, such as the PowerPC architecture, an AMD x86, or other known architectures.

As illustrated, example device 10 includes processor 12 formed as a central processing unit (CPU), host memory 14, and peripherals which are all interconnected through integrated interface circuits 16 and 18 (also referred to as north bridge 16 and a south bridge 18). All these may be formed on a motherboard.

Interface circuit 16 is a high speed interface and interconnects CPU 12, memory 14, and peripherals by way of a high speed expansion bus 20. Interface circuit 16 further interconnects CPU 12 to a lower speed interface circuit 18. One or more peripheral expansion slots 22 may be interconnected to interface circuit 16 by way of high speed expansion bus 20. An exemplary high speed expansion bus 20 is the PCI express (PCIe) bus that has a bandwidth in the gigabyte per second range, and allows data transfer reads and writes at this bandwidth.

Interface circuit 16 further includes a first graphics subsystem 30, embodied as an integrated graphics processor (IGP), suitable for generating video signals for display on display 26, which may be in the form of a monitor, LCD panel, television or the like.

An additional second graphics subsystem 40, forms part of device 10. In the exemplified embodiment, graphics subsystem 40 is embodied as an external graphics processor formed on a peripheral expansion card 46. Peripheral expansion card 46 is also connected to interface circuit 16 by way of expansion slots 22 on expansion bus 20. As will become apparent, by providing second graphics subsystem 40, device 10 may provide expanded graphics capabilities, not otherwise present in device 10. Graphics memory 50, for use as a frame buffer by second graphics subsystem, may be contained on the peripheral expansion card 46. Similarly, a power controller 60 in communication with graphics subsystem 40 may optionally be formed on expansion card 46, and may control operation of graphics subsystem 40. Specifically, power controller 60 may throttle clocks, such as memory and pixel clocks, used by components of graphics subsystem 40; disable (or disconnect) functional blocks of graphics subsystem 40; lower voltages applied to portions of graphics subsystem 40; or otherwise place subsystem 40 in one or more modes in which power consumption is reduced, in known manners.

Another optional power controller 70 may be in communication with first graphics subsystem 30, and may throttle clocks, such as memory and pixel clocks, used by components of graphics subsystem 30; disable (or disconnect) functional blocks of graphics subsystem 30; lower voltages applied to portions of graphics subsystem 30; or otherwise place subsystem 30 in one or more modes in which power consumption is reduced, in known manners.

Although exemplified graphics subsystem 40 is formed on peripheral expansion card 46, a person of ordinary skill will readily appreciate that graphics subsystem 40 could just as easily be formed on the motherboard of device 10, or elsewhere.

Interface circuit 18 interconnects lower speed peripherals and interconnects, such as an optical disk drive 28, and persistent storage memory 34 in the form of a hard drive by way of integrated IDE/SATA ports (not shown) and printers, and other peripherals by way of parallel or USB ports (not shown). Yet other peripherals may be interconnected by way of a lower speed expansion bus 24, compliant for example, with known PCI or ISA standards. Other components such as sound cards and networking interfaces (not shown) may similarly be interconnected to interface circuit 18 by way of low speed expansion bus 24, or otherwise.

As noted, device 10 may conveniently be formed as a portable computing device in the form of a laptop or smaller computing device. As such, a single housing may contain a DC power source 38, display 26 and the above mentioned motherboard and components. The second graphics subsystem 40 may be added to a single housing that houses the remainder of the computing device, or may form part of a docking station that only forms part of device 10, when device 10 is physically interconnected thereto.

Device 10 may be operated in at least two power consumption modes: a higher power consumption mode and a lower power consumption mode. In the depicted embodiments, device 10 the higher power mode may be assumed when device 10 is powered by a power source 36 connected to an AC (mains) supply; the lower power consumption mode may be assumed when device 10 is powered by a DC power source 38 using one or more batteries, fuel cells, or the like. Alternatively, power consumption modes may be user selected, software controlled, based on for example, user preferences, types of software applications being executed, battery levels, and the like.

Figure 4:
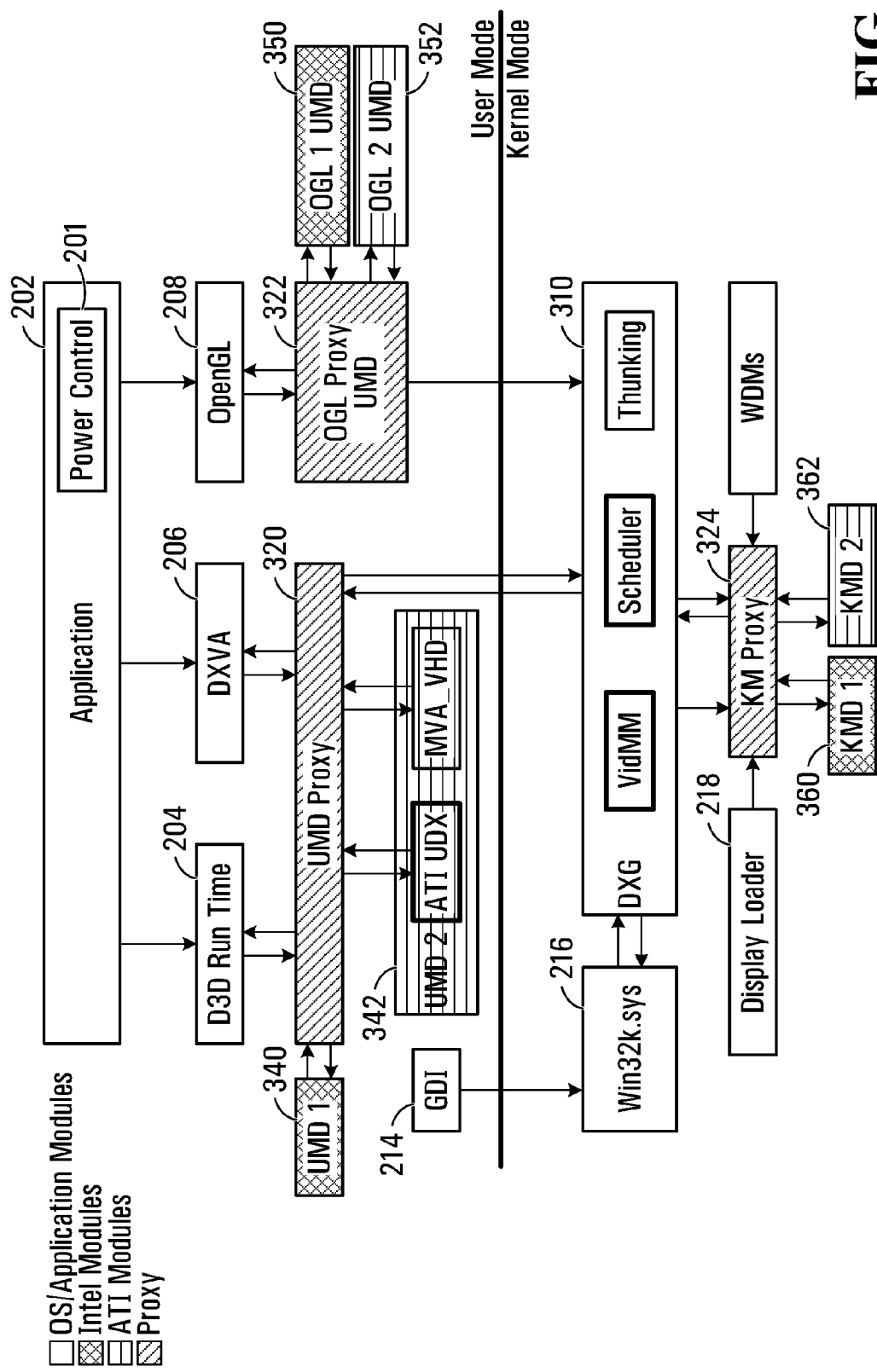
FIG. 4 is a simplified functional block diagram of exemplary software at the computing device of FIG. 2, including driver software exemplary of embodiments of the present invention.

In the depicted embodiment, device 10 executes software 200 stored within system memory, as illustrated in FIG. 4. System memory includes persistent storage memory 34 and host memory 14 (FIG. 2) and may further include a suitable combination of additionally random access memory, read-only memory and disk storage memory, used by device 10 to store and execute software 200. Exemplary software 200 could, for example, be stored in read-only memory or loaded from an external peripheral such as a disk drive 28 (FIG. 1), or over a computer network (not illustrated).

In the illustrated embodiment, software 200 is based on the Microsoft Vista platform. However, software operating device 10, in manners exemplary of embodiments of the present invention need not be based on this platform. Instead, exemplary software may work in conjunction with other known computer operating system, such as the Linux, MacOSX, or other operating systems. With different operating systems, the software architecture may be materially different from that depicted in FIG. 4.

In a Windows Vista operating system environment, low level control of hardware components, such as graphics subsystems 30, 40 is typically exercised by software components commonly referred to as drivers. Operation of each hardware component is controlled by one or more of such components.

Driver architecture, in the context of the Windows Vista Operating System is referred to as the Windows Device Driver Model (WDDM), and described more particularly in the Microsoft Windows Driver Kit API. Details may be obtained at http://www.microsoft.com/whdc/devtools/WDK/AboutWDK.mspx and http://msdn2.microsoft.com/en-us/library/aa480220.aspx, the contents of which are hereby incorporated by reference.

Figure 3:
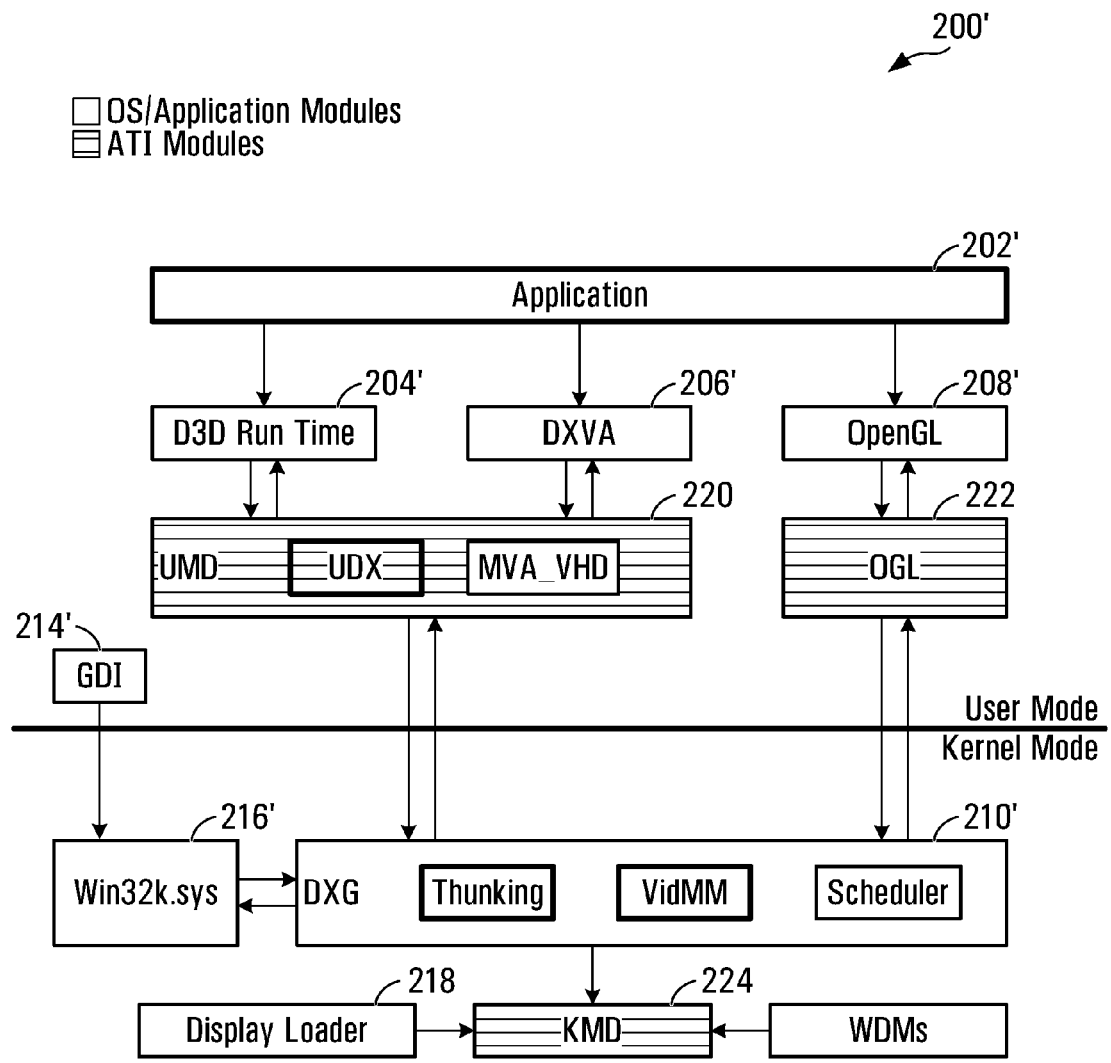
FIG. 3 is a simplified functional block diagram of conventional software.

Prior to explaining operation of software 200 illustrated in FIG. 4 an explanation of the conventional Windows Vista architecture is appropriate. To this end, FIG. 3, depicts conventional software 200' based on the Windows Vista operating system. As illustrated, software 200' includes application software 202', several generic, operating system graphics components 204', 206', 208', 210' (referred to as run-time components); and several hardware specific graphics device driver components 220, 222, and 224, defining device drivers for a graphics subsystem, like subsystem 30 or 40. As well, a display loader module 218', the Windows Vista kernel 216'; and the Windows graphics device interface (GDI) software 214' are also illustrated.

As will be appreciated, driver software under the Windows Vista operating system can run in either user mode or kernel mode. User-mode driver (UMD) components execute in a non-privileged mode supported by processor 12, and are only allowed limited to access to memory, registers, and the like. In FIG. 2, components 220 and 222 are UMD components. Other software, including application software 202' also executes in this mode. UMD components 220 and 222 and application software 202' cannot gain access to low-level system data directly. They similarly, cannot access all regions of memory, all registers, and the like. They may, however, make calls to software executing in kernel mode.

By contrast, kernel-mode driver (KMD) components execute in the same processor mode as the operating system kernel, and thus have generally unfettered access to the memory, registers and other resources of device 10. UMD components may call KMD components, to gain lower level access to the resources of computing device 10. Component 224 is a KMD component. KMD driver architecture is further detailed in Sample Drivers for the Kernel Mode Driver Framework, 10 May 2006 http://www.microsoft.com/whdc/driver/wdf/KMDF-samp.mspx and in Introduction to WDM http://msdn2.microsoft.com/en-us/library/aa490246.aspx.

UMD components and KMD components have different structures, different entry points, and different system interfaces. Whether a device requires a UMD or KMD depends on the type of device and the support already provided for it in the operating system. Drivers for graphics subsystems, such as graphics subsystems 30, 40 typically include at least one component running in kernel mode. Further, in the Windows Vista operating system, KMD components are loaded at system initialization (i.e. power-up), while UMD components may be loaded, on demand, as required.

More specifically, in the Windows Vista architecture, UMD components for graphics subsystems communicate with corresponding KMD components in order to gain low level access to resources used by these subsystems. Typically, each KMD component provides a device driver interface (DDI), known to a corresponding UMD component. A DDI may include function calls, objects (including methods), input/output control (IOCTLs) calls and associated data structures. As will be appreciated, function calls receive data through function/method parameters that are often organized in such data structures. The exact nature of the data structure is specified in the DDI definition.

In the depicted embodiment, operating system graphics components 204', 206', and 208' are run-time components provided by the operating system manufacturer (in this case Microsoft); while hardware specific driver components 220, 222 and 224 in the form of UMD and KMD components may be provided by a third party manufacturer (such as the manufacturer of graphics subsystem 30 or 40).

Operating system graphics components include a run time 3D graphics run-time component 204' (Direct 3D Run time); a hardware accelerated graphics interface run-time component (DXVA) 206'; a 3D Open Graphics Library (OpenGL) run-time graphics component 208'. Corresponding hardware specific UMD components 220 and 222 provide hardware specific implementation of API hardware calls corresponding to Direct 3D, DXVA and OpenGL APIs.

Run-time components 204', 206', 208' and UMD components 220, and 222 provide a unified graphics application programmer interface (API) for use by application software 202' and the remainder of the operating system. Specifically, the APIs provide function calls, objects, and the like, that cause execution of driver software routines (e.g. functions or methods) in UMD components 220' and 222' or in run-time components 204', 206', 208', as detailed by Microsoft. API calls may be made by application software 200'; by portions of the operating system (e.g. modules 204', 206', 208'), or by other drivers. UMD components 220 and 222 in turn execute software code (typically in the form of functions, or object methods) corresponding to the API calls. Functions and call-backs provided by D3D, DXVA and OpenGL UMD components 220 and 222 are detailed in Windows Driver Kit: Display Devices Windows Vista Display Driver Model Reference available from the Microsoft Developer's Network (www.msdn.com), the contents of which are hereby incorporated by reference.

More specifically, after a UMD component 220, 222 or a KMD component 224 is loaded by a loading routine of the operating system locates the driver component entry point—named DriverEntry( ) (for Kernel mode drivers) or DllMain( ) or otherwise (e.g. OpenAdapter( )) for the UMD components 220, 222. The UMD/KMD components 220, 222, 224 include functions that receive a well-known structure from the OS that is filled by code at the entry point of the UMD/KMD component 220, 222, 224 to point to the functions within the UMD/KMD components 220, 222, 224 that implement an expected behavior. The names are defined by the DDI specification and implemented through the so-called definition file.

For example KMD component 224 receives the DRIVER_INITIALIZATION_DATA structure that includes of a set of function pointers for a variety of operations that are part of the driver-implemented function set of a DDI. As required, the remainder of UMD components 220, 222 may call these functions to initiate an appropriate operation in the driver that in many—but not necessary all—cases will cause access to the hardware (usually by calling some further KMD driver-internal functions).

UMD components 220 and 222 may be formed as dynamic linked libraries (DLLs), and conform to the WDDM. As such, each UMD component 220 and 222 provides a collection of functions and objects, IOCTs in accordance with the WDDM. Broadly, each driver component includes a defined entry point DriverEntry( )); defined object classes; driver entry points; defined functions and call-backs. After each driver is loaded, software code at its entry point is executed DriverEntry( ) and defined driver routines are registered in an expected structure.

The DllMain( ) entry point is used to allocate and initialize basic data structures of the UMD component or take those down in a controlled mechanism when the UMD is unloaded.

In case of the WDDM UMD component, the OpenAdapter( ) call works in a manner similar to the DriverEntry( ) call of the KMD component. That is, the OpenAdapter( ) call receives a data structure with a set of function pointers that the UMD component 220, 222 fills to point to appropriate functions within the UMD component.

The names and supported functions/object and associated code addresses within the UMD are thus returned to the remainder of the operating system, by way of this structure. Again, UMD functions and structures supported by D3D, DXVA and OpenGL UMD components 220 and 222 are detailed in Windows Driver Kit: Display Devices Windows Vista Display Driver Model Reference available from the Microsoft Developer's Network, supra.

Thus, at the conclusion of loading each UMD component 220 and 222, API functions/objects, and IOCTLs are known to applications 202' and the remainder of the operating system software. API objects may be instantiated by application software 200, by creating instances of objects at identified address. Functions/methods and IOCTLs may be executed at their corresponding addresses.

Operating system graphics modules further include a kernel mode graphics core software component 210' (referred to as the DirectX Core in the Windows Vista operating system), and a KMD component 224. Graphics core software component 210' provides an API for UMD components 220 and 222, allowing these to obtain kernel mode access to resources of device 10. Graphics core software component 210' may further include a video memory manager; a scheduler; and routines to translate (or "thunk") certain API/DDI calls for compatibility. KMD component 224 may conform to the Windows Driver Model, or the Windows Driver Framework, as detailed above. As such, KMD component 224 includes defined object classes, functions and structures, providing a DDI.

Like UMD components 220 and 222, KMD component 224 includes an initialization routine, DriverEntry( ), that returns identifiers of object classes, functions and structures, typically by name and memory address, providing the required DDI for KMD component 224. As noted, KMD component 224 is typically loaded (and initialized) at system startup.

Additionally, KMD component 224 may include a DDI not specifically known or reported to the remainder of the operating system, but known to a complementary UMD driver 220 or 222.

Software 200 is layered, with higher level layers using lower layers to provide certain functionality. So, application software 202 typically renders graphics by making calls to run-time operating system graphics modules 204', 206', 208', or UMD components 220 and 222 or GDI 214'. Graphic modules 204', 206', and 208' contain only generic, hardware-independent code that is common to all third party video drivers. Run-time components 204', 206', 208' in turn, may make API/DDI calls to UMD components 220 and 222. Known parameters, defined in data structures are passed to UMD components 220 and 222, for example by suitable pointers to populated structures. UMD components 220 and 222 contain hardware specific code, and structures. However, as noted, UMD components 220, 222 only have user level access. UMD components 220 and 222 communicate with KMD component 224, directly using known API/DDI provided by KMD component 224 or through kernel mode graphics core software component 210'.

KMD component 224, in turn includes, functions, objects and the like that may pass appropriate low level instructions to the underlying hardware (e.g. graphics subsystem 30 or 40). Multiple calls to the KMD component 224 may further be queued. The low level instructions, in turn may be executed by the underlying hardware. For example, the low level instructions may include graphics processor executable instructions, and the like.

Unlike many other known operating system, Windows Vista only allows loading of a single display driver KMD component 224'. A further ancillary application acts as a display driver loader 218'. Loader 218' is typically executed upon start up, but may also be executed after start up. Loader 218' loads third party KMD components (e.g. KMD component 224'), and initializes it, for access by graphics core software component 210. Although loader 218 may be used to load/unload kernel mode driver components, like KMD component 224', the loading of one graphics KMD component, requires unloading of another driver.

Now, in the presence of two graphics subsystems, like subsystems 30, 40, (FIG. 1) UMD components 220 and 222 and KMD component 224 may control operation of both graphics subsystems, and allow selectively switching operation between the two graphics systems. API calls to driver components 220, 222 and 224 may identify which of multiple subsystems is being addressed. However, the requirement that a single UMD/KMD provides support for multiple graphics subsystems introduces limitations. For example, it may be impractical for a single driver to support a large assortment of different adapters. This problem is exacerbated if the subsystems are provided by different manufacturers.

FIG. 4 accordingly illustrates software and graphics modules, exemplary of embodiments of the present invention. Again, exemplary software is depicted in the context of a Windows Vista environment. As such, modules and components forming part of the operating system are the same as those depicted in FIG. 3, and are thus depicted with the same numerals (but without the (') symbol) in FIG. 4 and will not be further detailed.

Notably, however, UMD components 220 and 222 and KMD component 224 (FIG. 3) have been each been replaced with a proxy driver component—UMD proxy components 320, 322 and KMD proxy component 324. As will become apparent, UMD proxy components 320 and 322 and KMD proxy component 324 present to the remainder of operating system, a single set of APIs/DDI and appear as a single graphics driver. As such, run-time components 204, 206, 208; application software 202; and the remainder of the operating system may invoke (or call) graphics API functions/objects, as in FIG. 3.

An additional power control application 201 is also functionally depicted. As will become apparent, power control application may control the overall power consumption states of graphics subsystem 30, 40 of FIG. 1. Power control application 201, may be a stand-alone application, or may form part of an overall user/graphics subsystem control and configuration application—such as the Catalyst Control Center application, available from ATI/AMD Inc.

UMD proxy components 320 and 322 and KMD proxy component 326, in turn, route calls for such graphics functions to one of multiple individual hardware specific UMD graphics driver components 340, 342; 350, 352; and KMD graphics driver components 370 and 372. Specifically, UMD proxy component 320 routes calls to UMD component 340 or 342; UMD proxy component 322 routes calls to UMD component 350 or 352; and KMD proxy component 324 to KMD proxy component 360 or KMD proxy component 362, as detailed below.

UMD components 340, 350 and 342, 352 are hardware specific UMD components corresponding to graphics subsystems 30 and 40, that like UMD component 220, include functions, objects, IOCTLs, and the like, that are hardware specific—to graphics subsystems 30 and 40, respectively. KMD components 360, 362 are likewise similar to KMD component 224, and include functions, objects, IOCTLs, and the like, designed to interact in kernel mode, with graphics subsystems 30, 40.

For example, UMD components 340, 350 and KMD component 360 may respectively provide user mode DirectX driver software; OpenGL driver software and kernel mode driver software components for a first graphics subsystem 30; while UMD components 342, 352 and KMD component 362 may provide user mode driver software; OpenGL driver software and kernel mode driver software for second graphics subsystem 40. Conveniently, components 340, 350 and 360 (or components 342, 352 and 362) may be conventional, in that they may be loaded directly by the operating system as depicted in FIG. 3, in place of graphics UMD/KMD components 220, 222 and 224.

In this way, each of the graphics UMD/KMD components 340, 342; 350, 352; 360, 362 may perform low level graphics function and access graphics hardware in a manner specific to the included graphics hardware.

Conveniently, UMD proxy driver components 320, 322 and KMD proxy driver component 324, on the one hand present a uniform API/DDI to the remainder of operating system and other applications, and on the other, routes calls, IOCTLs, requests, present objects, and the like (collectively API/DDI calls) to hardware specific UMD/KMD driver components 340, 350 and 360, or 342, 352 and 362.

In operation, UMD proxy driver components 320, 322 and KMD proxy driver component 324 are loaded by the remainder of the operating system.

Once a UMD proxy driver component 320 or 322 is loaded, its entry routine (e.g. DllMain( )/OpenAdapter( )) is executed. As will become apparent, the entry routine of UMD proxy driver components 320, 322 load one or both of UMD components 340, 342 and provides to the remainder of the Vista Operating System an expected data structure identifying supported API/DDI calls in UMD proxy driver component 320, 322 in much the same way as UMD components 222 and 224 do. Again, addresses of expected API/DDIs are provided in the form of addresses to functions, objects, IOCTLs by way of an anticipated structure.

Figure 5:
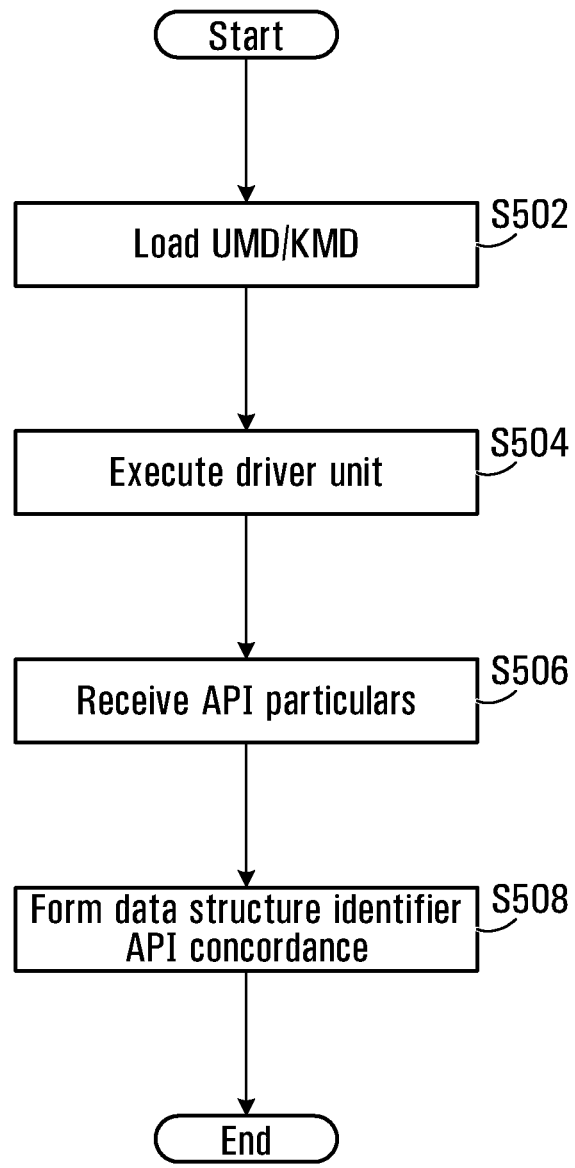
FIG. 5, is a flow chart detailing steps performed by software at the device of FIG. 2, exemplary of embodiments of the present invention.

UMD components 340 and 342 are loaded by software code within UMD proxy driver component 320, as more particularly illustrated in block S500 in FIG. 5. Specifically, in block S502 a UMD driver component, such as UMD component 340 or 342, is loaded, typically as a dynamically linked library. Next, the driver initialization routine DllMain( )/OpenAdapter( ), or the like, of the newly loaded UMD component 340 or 342 may be called by UMD proxy driver component 320. The driver initialization routine return of the newly loaded UMD component 340 or 342 returns the names and addresses of supported functions; IOCTLs and the like (in the same way as UMD component 220, 222 return such names, addresses, etc.) to UMD proxy component 320 in block S504. Next, UMD proxy driver component 320 forms a data structure representing a concordance, between object classes; functions; IOCTLs; etc. to be supported by the loaded UMD component 340 or 342 in block S508.

For example, UMD proxy driver component 320 is designed to support DXVA function calls and objects, and thus forms a concordance between known DXVA function calls and objects such, and their entry points within the loaded UMD component 340 or 342. At the conclusion of block S506, UMD proxy driver component 320 may form a structure in memory providing addresses in UMD component 340 or 342, corresponding to each supported DXVA function, object, IOCTL, etc. supported by UMD proxy driver component 320.

Specific UMD components 340 or 342; 350 or 352 may be loaded by proxy driver components 320 and 322, or dynamically as required. In particular, if any graphics subsystem 30 or 40 is not in use, its corresponding UMD driver components need not be loaded.

Software corresponding to blocks S500 may be performed for each UMD driver 340 and 342 to be loaded by UMD proxy driver component 320. Steps S500 are similarly performed by UMD proxy driver component 322, acting as a proxy driver component for UMD components 350 and 352.

As well, blocks S500 are also performed upon initialization of KMD proxy driver component 324—typically at system startup. KMD proxy driver component 324 executes the initialization routines of KMD drivers 360 and 362 (e.g. Open-Adapter( )).

Once blocks S500 (or their equivalents) have been performed by each UMD proxy driver component 320, 322 and by KMD proxy driver component 324 for each supported driver component (e.g. UMD components 340, 342; UMD components 350, 352; and KMD components 360, 362), UMD/KMD proxy driver components 320, 322 and 324 will have loaded UMD/KMD components specific to graphics subsystems 30, 40 and will have ascertained corresponding memory addresses/entry points of supported functions, IOCTLs, etc. in loaded UMD components 340, 342; 350, 352; and KMD component 360, 362.

For the purposes of providing system resource information to the remainder of the operating system, only KMD proxy component 324 would be directly visible and installable for both graphics subsystems 30, 40. Driver specific registry entries for both graphics subsystems 30, 40 may be merged so the proxy driver component can read and expose these to UMD components 340, 350; 342, 352.

UMD components 340, 342; 350, 352 may also return a number of properties that need to be gathered and adjusted by UMD proxy components 320, 322 to ensure that the properties returned are consistent with a single driver used to interact with multiple graphics subsystems. These properties may be passed by UMD proxy components 320, 322 to the operating system. For example, Video memory heaps, GPU engine properties, DMM topology, etc. may need to be combined by UMD proxy components 320, 322.

As a further alternate to loading UMD/KMD components 340, 342; 350, 352; and 360, 362, these could be statically linked to UMD proxy driver components 320, 322; and KMD proxy component 324, as these are built. This, of course, would require access to the source code for UMD/KMD components 340, 342; 350, 352; and 360, 362, or linkable object modules.

Figure 6:
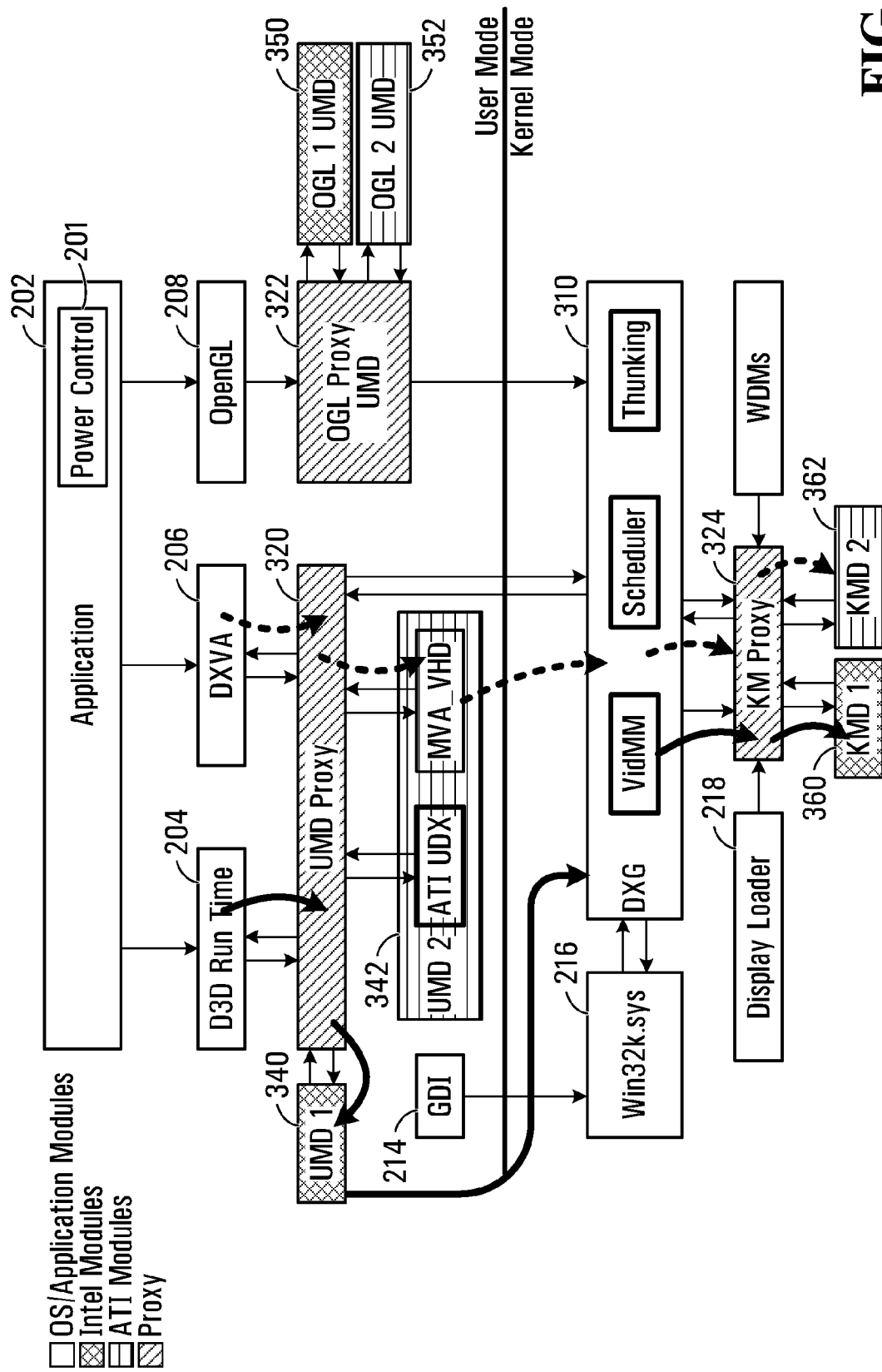
FIG. 6 schematically illustrates API/DDI calls in the software of FIG. 4.

As a consequence UMD proxy components 320, 322; and KMD proxy component 324 loading/linking driver UMD components 340, 342; 350, 352; and 360, 362, UMD proxy driver component 320, 322; and KMD proxy 324 may now route API/DDI calls to UMD/KMD proxy components 320, 322 and 324 to individual UMD/KMD components 340 or 342; 350 or 352; and 360 or 362, in dependence on which graphics subsystem 30 or 40 is being addressed by application software 202 or the remainder of operating system. This is graphically illustrated in FIG. 6.

The particulars of the API/DDI calls supported by UMD proxies 320, 322; and KMD proxy 324 may be exposed to the remaining applications and operating system by populating a data structure with the particulars of routing routines for supported API/DDI calls that are actually performed by UMD components 340, 342; 350, 352; and KMD components 360, 362.

API/DDI calls may be routed within UMD/KMD proxy driver components 320, 322 and 324 by these routing functions (or objects). The address of each routing routine or object of the UMD/KMD proxy driver components 320, 322 and 324 may be exposed to the operating system and other applications, in correspondence with the particular API function/call/object/IOCTL, etc. to be routed. Each routing routine or object, in turn routes calls to one of the UMD/KMD driver components for which the proxy driver component acts as a proxy. In this way, an API/DDI call to proxy driver components 320, 322 and 324 may be routed to the corresponding driver function/call/object/IOCTL, in UMD driver 340, 342 or 350, 352 or KMD component 360, 362.

Figure 7:
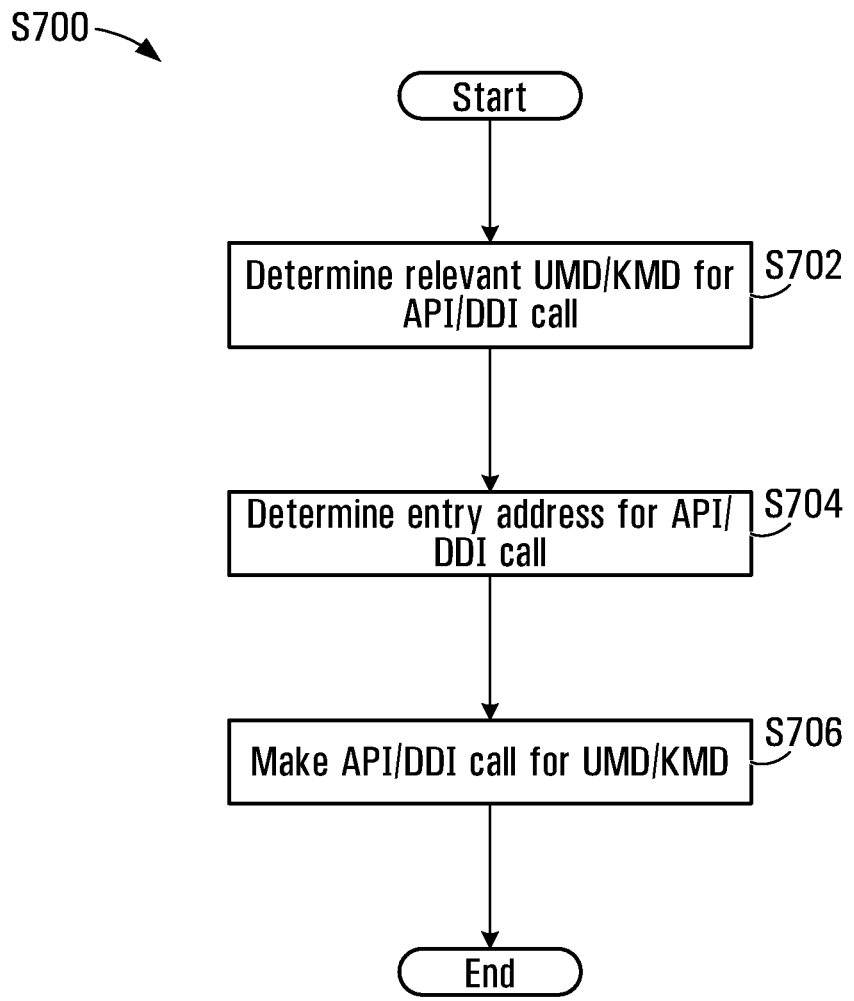
FIG. 7 is a flow charts detailing steps performed by software at the device of FIG. 2, exemplary of embodiments of the present invention.

Specifically, as illustrated in FIG. 7 each API/DDI call may simply be rerouted by UMD/KMD proxy driver component 320, 322 or 324, based on an address of corresponding function/call/object/IOCTL in UMD components for which a corresponding entry point has been determined in block S508 in block S700. Specifically, upon execution of steps S700, UMD/KMD proxy component 320, 322 or KMD proxy component 324 determines which of the UMD/KMD component (e.g. UMD component 340, 342; 350, 352; or KMD component 360, 362) should handle the API/DDI call in block S702. This may, for example, be performed by parsing the API/DDI call or associated data to identify the relevant graphics subsystem, or simply by determining which of multiple graphics subsystems is currently in use. As detailed, below, the currently in use graphics subsystem 30 or 40 may depend based on the power consumption mode of device 10. The subsystem currently in use typically renders graphics/video to be displayed and viewed by the end-user.

Once the relevant driver has been identified, UMD/KMD proxy component 320, 322 or KMD component 324 determines the address of the API/DDI call with reference to the concordance structure formed in block S508 in block S706. Once the address has been determined, the API/DDI call within the relevant UMD/KMD component 340 or 342; 350 or 352; 360 or 362 may be made. The UMD/KMD component then executes code corresponding to the API/DDI call.

Notably, calls to UMD components 340, 342 or 350, 352 may make further kernel mode API/DDI calls. These may result in API/DDI calls to KMD proxy component 324. KMD proxy component 324, like UMD proxy components 320, 322 route the DDI call to the appropriate KMD component 360, 362, as detailed in FIG. 7. The KMD proxy component 324 may determine to which KMD component 360, 362 the kernel mode API/DDI call should be routed in much the same way as UMD proxy components 320, 322 make the assessment—i.e. in dependence on the nature of the call or in dependence on the currently active graphics subsystem.

For calls that are accompanied by data (e.g. through the creation of objects, or by way of function parameters), pointers to the data may be passed by UMD proxy components 320, 322 or KMD proxy component 324 to the determined UMD component 340, 342, 350, 352 or KMD component 360, 362. If the data cannot be passed as a pointer the data may be tunnelled to a corresponding data structure.

Some API/DDI calls may not be known to the remainder of the operating system and may not be returned to the UMD proxy driver component 320, 322 or KMD proxy driver component 324 upon initialization (e.g. upon execution of DII-Main( ) or AdapterOpen( )). This may be particularly so for KMD components such as KMD components 360 or 362 that interact with a complementary UMD component, such as UMD components 340, 342, provided for example by a single manufacturer/supplier. Although DDI calls may be supported, they need not be exposed to the operating system. Such calls can typically not be routed by KMD proxy driver component 324, without further knowledge. To avoid this, each KMD component 360, 362 should reporting all supported API/DDIs that may, for example, be involved in the general operating system communication for the operating system scheduler context switch and paging requests, in response to executing the driver initialization routine. Insofar as this is not possible, KMD component 360, 362 may further include a query routine to return information about the API/DDIs calls that would be required by KMD proxy driver component 324.

The proxy driver component should also receive calls from the UMD/KMD components that are done to API/DDI calls to ensure that it can track any state changes affecting graphics subsystems 30 and 40.

Figure 8:
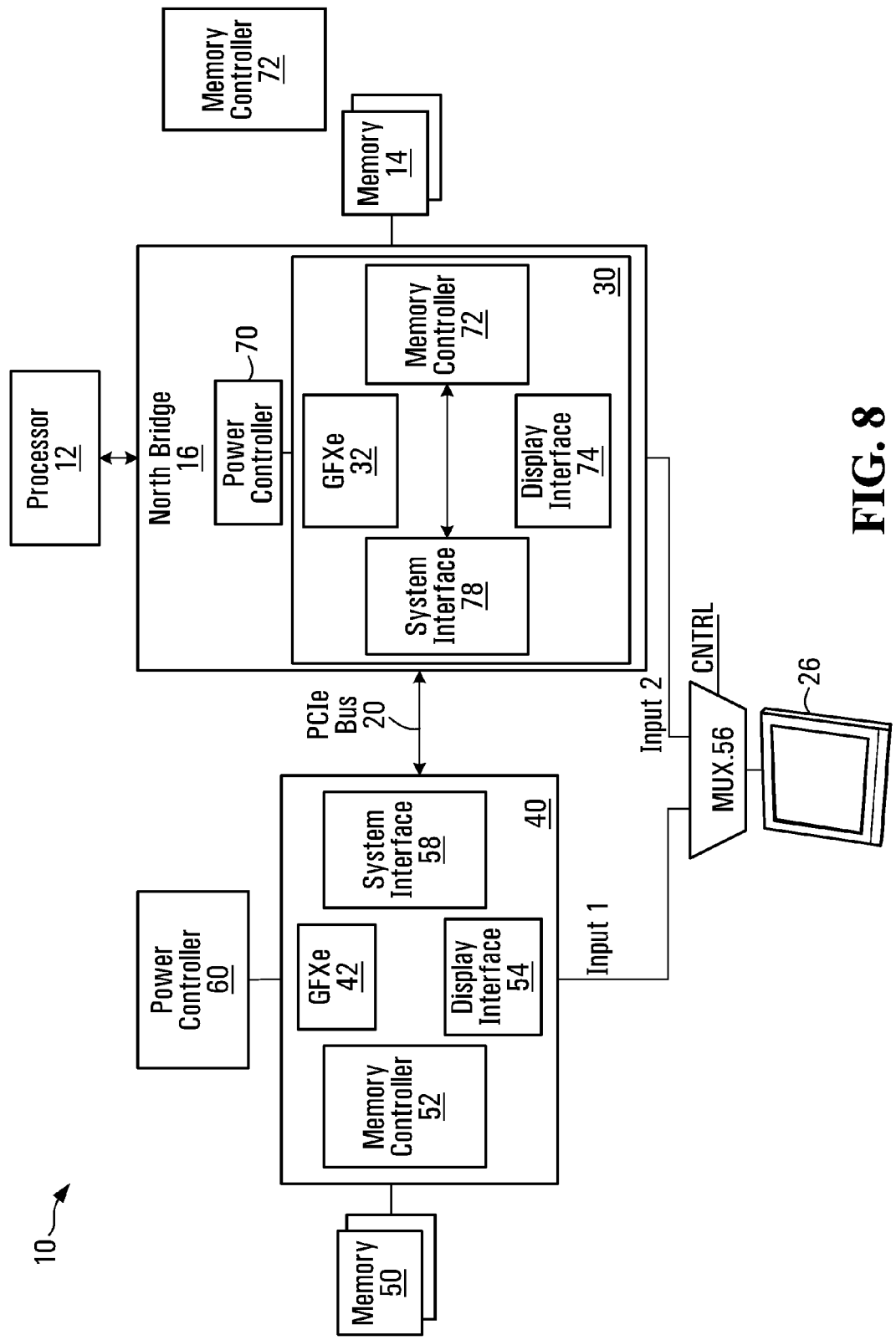
FIG. 8 is a further simplified schematic block diagram of the computing device of FIG. 2.

FIG. 8 shows a further simplified block diagram of a portion of device 10 of FIG. 2, in which the software 200 (and in particular UMD proxy components 320, 322 and KMD proxy component 324) of FIG. 4 may be used. As illustrated, interface circuit 16 interconnects central processor 12 and system memory 14. Graphics subsystem 30 (embodied as a graphics processor on interface circuit 16) including graphics engine 32, a memory controller 72, a display interface 74, and a bus interface 78.

Graphics engine 32 is a functional block capable of rendering 2D graphics or 3D graphics decoding video, or the like. As will be appreciated, graphics subsystem 30 may include multiple graphics engines.

Memory controller 72 allows graphics subsystem 30 provide access to graphics memory and host memory 14. In the depicted embodiment, graphics memory used by graphics subsystem 30 forms part of host memory 14. However, a person of ordinary skill will readily appreciate that graphics subsystem 30 may include or be in communication with its own local memory. Bus interface 78 enables subsystem 30 to communicate over bus 20.

As will be appreciated, display interface 74 may be any suitable interface for converting data within a buffer for display on a display device 26 interconnected by port 78. For example, display interface 74 may take the form of a random access memory, digital to analog converter ("RAMDAC"). One or more video connectors allow interconnection of graphics subsystem 30 to one or more display devices, such as an LCD panel, monitor, television, or the like. Output port 78 may be in the form of VGA ports; composite video ports; DVI ports, LVDS ports, DVO ports, SDVO ports, or the like.

Graphics subsystem 40 (formed, for example, on peripheral expansion card 46 of FIG. 2), is also connected to interface circuit 16 by way of an expansion slot on high speed expansion bus 20. Graphics subsystem 40 includes graphics engine 42, a memory controller 52, bus interface 58, and display interface 54. Graphics subsystem 40 includes or is in communication with graphics memory 50.

Graphics engine 42, like graphics engine 32, is a functional block capable of rendering 2D graphics or 3D graphics decoding video, or the like. As will be appreciated, graphics subsystem may include multiple graphics engines. Possibly, graphics engine 42 may provide functions simply not provided by graphics engine 32.

Memory controller 52 allows graphics subsystem 40 to access memory 50 and host memory 14. Bus interface 58 enables graphics subsystem 40 to communicate over bus 20.

Display interface 54, by way of memory controller 52 samples a frame buffer in graphics memory 50 and presents an image at a video connector. In this way, images rendered by external graphics engine 42 in frame buffer in memory 50 may be displayed. The video connector may be connected directly to an external display, or to the motherboard of device 10, where video signals may be routed to an integrated display, or a connector for attaching an external display to device 10. Again, display interface 54 may be any suitable interface for converting data within a buffer for display on a display device 32 such as a RAMDAC, single-ended or differential transmitter, or the like.

As noted, a power controller 60 is in communication with graphics subsystem 40 and controls the power consumption of each or some of and one or more of display interface 54; memory controller 52; graphics engine 42; bus interface 58; and graphics memory 50, using conventional power consumption techniques, such as clock and voltage throttling, powering down, or otherwise disabling all or some of these components. Power controller 60 may be controlled by signals on bus 20 or otherwise, and may, for example be compliant with the ACPI standard.

Graphics subsystem 30 operates in much the same way as graphics subsystem 40. As such, graphics subsystem 30 uses memory controller 72 to access a frame buffer held in host memory 14 or in memory local to graphics subsystem 30. This frame buffer is sampled by display interface 74 and an image is presented at video output connector, which could be directly connected to a display. In an effort to provide economical integrated components, graphics subsystem 30 provides limited functionality. For example, resolution, memory, graphics processor speed, 3D graphics abilities, and the like of graphics subsystem 30 may be relatively limited and may operate more slowly than external graphics processor 42 of graphics subsystem 40.

Computationally intensive graphics, such as three dimensional graphics, game graphics, and the like are more effectively performed by graphics subsystem 40. Use of add-on graphics subsystem 40 within device 10 therefore allows end-users to experience the latest in graphics intensive applications, such as games, computer aided design software, animation software, rendering software and the like. Conveniently, add-on graphics subsystem 40 may be chosen by an end-user, and replaced and kept current, as required. In the past, additional graphics computing power was only available on workstation computing devices. With the advent of expansion slots on mobile computing devices, such computing power is now available to owners of portable computers such as laptops. Of course, use of a higher (or different) performance graphics engine 42 on graphics subsystem 40 increases overall power consumption of device 10. This increased power consumption may not be sustainable on a computing device that is powered by a battery source.

At the same time, in the presence of an add-on graphics subsystem 40 with graphics engine 42, graphics subsystem 30 may be redundant. For example if multiple physical displays are not connected to device 10, graphics subsystem 30 may not play a role. Graphics subsystem 30 may therefore be disabled. Alternatively, in the presence of a power controller 70 controlling operation of graphics subsystem 30, graphics subsystem 30, when not in use may also be placed in a lower power mode. Again, power controller 70 may disable or disconnect portions of graphics subsystem 30, or clock or voltage throttle portions of graphics subsystem 30.

Exemplary of an embodiment of the present invention, software 200 (FIG. 4) serves to allow device 10 to selectively disable one higher power graphics subsystem 40, in the presence of subsystem 30.

To this end, and as shown in FIG. 8, computing device 10 further includes a switch 56. Switch 56 receives video signals generated by subsystem 40 and subsystem 30 at first and second inputs. Switch 56 may be any suitable video switch, such as a multiplexer, and is operable to present one of the conventional video signals at its two signal inputs at its video output connector. Presented video signals at the inputs of switch 56 may be conventional video signals such as digital signals (such as LVDS or TMDS formats or the like) or analog signals (such as VGA format). If switch 56 is configured to receive both digital and analog input signals, or provide video in either output, switch 56 may include a format converter. Moreover, switch 56 may include one or more video outputs to allow for connection either a digital or analog display device 32, or both.

Switch 56 further includes a control input (CNTRL). This control input controls which signal input is provided to the video output of switch 56. In the depicted embodiment, the control input is toggled by processor 12, by way of a general purpose input output (GPIO) interface (not illustrated), in response to detecting or determining a change in the power mode of device 10 is required or desired. As will become apparent, switch 56 is configured such that the conventional video signal generated by graphics subsystem 30 is selected if device 10 is operating in a low power consumption mode. Conversely, video signals generated by the higher performance external graphics subsystem 40 are selected for display if device 10 is operating in a higher power consumption mode. Similarly, power provided to graphics subsystem 40 or graphics subsystem 30, may be reduced or disabled. Switching may be effected dynamically, while computing device 10 is in use, without requiring device 10 to restart (i.e. cold or warm start).

To accomplish this, computing device 10 may also include at least one power controller 60, described above. In the depicted embodiment, power controller 60 forms part of the peripheral expansion card 46 carrying graphics subsystem 40. However, power controller 60 could just as well form part of motherboard of computing device 10, or as part of interface 16. If power controller 60 forms part of the expansion card 46, it may have greater flexibility to control operation of subsystem 40. If power controller 60 forms part of computing device 10, it may only have the ability to disable power to graphics subsystem 40.

Figure 9:
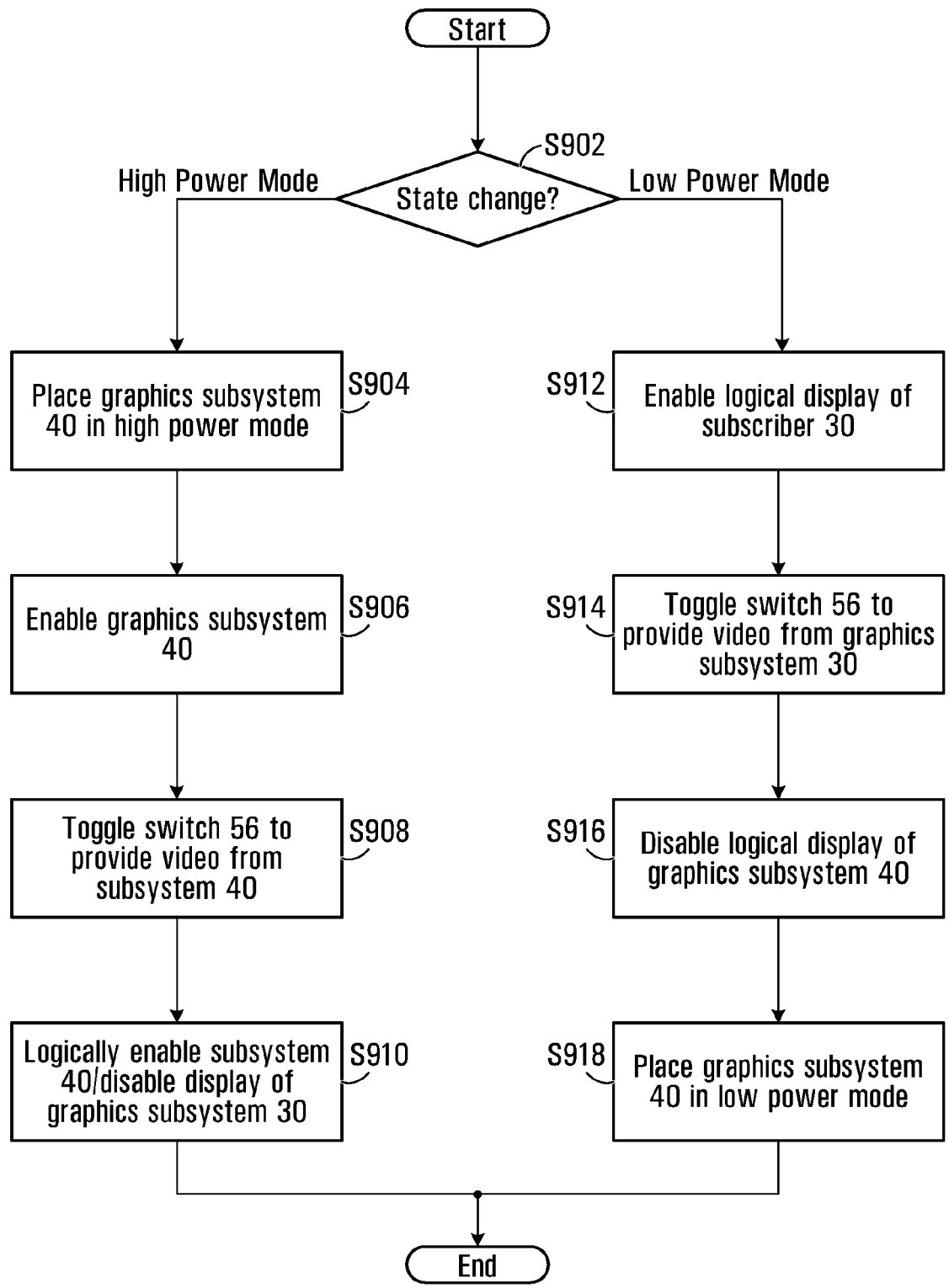
FIG. 9 is a flow chart detailing steps performed by software at the device of FIG. 2, exemplary of embodiments of the present invention.

Software 200 within system memory 12 is used in order to configure and control switch 56 and power controller 60. FIG. 9 is therefore a flow chart, illustrating exemplary software blocks S900 for switching device 10 between two available power consumption modes in exemplary of an embodiment of the present invention.

Now, exemplary of embodiments of the present invention, the power state of device 10 is assessed when device 10 is initially powered up. Power control application 201 configures graphics subsystem 30 and 40 and switch 56, as required and as detailed below.

Software blocks S900, exemplary of embodiments of the present invention, may be performed by processor 12 under control of power control application 201 within system memory 10. Blocks S900 may be performed each time device 10 undergoes a state change, for which graphics subsystems 30 and 40 should be configured accordingly. As illustrated, in block S902 power control application 201 determines whether device 10 should assume its higher power consumption mode, or its lower power consumption mode.

Application 201 (FIG. 4) may maintain a table that indicates which graphics subsystem 30, 40 is the preferred device for a specific graphics power state. Each user power state is mapped to a graphics subsystem 30, 40 and corresponding state for that subsystem. Power states for individual graphics subsystems 30, 40 may operating parameters such as clock speeds; memory speeds; pixel clock speeds; rendering capabilities; etc. of a currently active graphics subsystem 30 or 40.

In the example embodiment, the higher power consumption mode may be used when device 10 is operating from an AC power source 36; the lower power consumption mode may be used when device 10 is operated by way of a DC power supply 38, when the DC source 38 is low, or the like. In the higher power consumption mode, graphics subsystem 40 is active. In the lower power consumption mode, graphics subsystem 30 is active.

If device 10 is to resume (or transition to) its high power consumption mode, blocks S904-S910 are executed. In block S904 subsystem 40 is placed in its full operational (high power consumption) mode, if it is not already in this mode. This may be performed by a suitable driver call—(for AMD or ATI graphics subsystems a conventional ATPX ACPI method may be used; similar methods or functions may be used for drivers for graphics subsystems from other manufacturers), providing an appropriate signal to power controller 60, by processor 12. Next, subsystem 40 is enabled in blocks S906. This may be performed by enable subsystem 40 using Windows PnP calls in Configuration manager. Once the subsystem is enabled, the operating system may enumerate all devices to obtain new device names. The Windows EnumDisplayDevices( ) API function may be used for this purpose. Thereafter, an extended desktop with both devices may be created using Windows ChangeDisplaySettingsEX( ) API call. Application 201 may now sense that the number of adapters has changed (e.g. by receiving a WM_DISPLAYMODECHANGE message). Application 201 may the issue a restart command. Displays may be powered off using the CWDDEDI, function for drivers for ATI/AMD graphics subsystems, or using similar functions for drivers for graphics subsystems from other manufacturers, and Disable integrated $I^2C$ controller, disable $I^2C$ buffer using control method call, all in block S906. In block S908 switch 56 may be configured to select its output from graphics subsystem 40, using for example the ATPX ACPI method, for ATI/AMD graphics subsystems, or using similar functions for drivers for graphics subsystems from other manufacturers. In block S910, the newly enabled graphics subsystem 40 may be logically enabled, so that it is visible to the remainder of the operating system. This may be done using Windows ChangeDisplaySettingsEX( ) API call. As well, graphics subsystem 30 may be logically disabled, by detaching the subsystem from the displayed desktop. This may be done using the Windows ChangeDisplaySettingsEX( ) API call. A further private API (escape) call may be made to driver to hide integrated displays when it is queried by the operating system, thereby hiding the disabled graphics subsystem.

As noted, under Vista, only one graphics KMD can be active. To support two graphics subsystems 30, 40 that normally are controlled by two different device drivers, KMD proxy component 324 acts as the kernel mode driver for the two graphics subsystem 30, 40. Likewise, UMD proxy components 320, 322 act as the single UMD.

When device 10 is to transition to, or resume its low power consumption mode, blocks S912-S918 are executed. Broadly speaking, graphics subsystem 40 is disabled and placed in its low power consumption mode, while graphics subsystem 30 is enabled. To do so, graphics subsystem 30 is enabled in blocks S912 and S914. Again, this may be performed by logically enabling the display associated with graphics subsystem 30 in block S912, and logically disabling the displays connected with subsystem 40, in block S914. Blocks S912 and S914 may be performed, by appropriate operating system API calls, such as the EnumDisplayDevices( ) and ChangeDisplaySettingsEX( ) calls described above, or direct communication with hardware.

After the display is logically disabled, API calls to KMD components 360, 362 may be used to physically place graphics subsystem 40 in its low power mode in block S918. As such, processor 12 provides a suitable signal to power controller 60 placing graphics subsystem 40 in its low power state. In its simplest form, power controller 60 disconnects power to graphics subsystem 40, or components of graphics subsystem 40. Alternatively, power control application 201 may instruct power controller 60 to place graphics subsystem 40 to enter into a lower power sleep mode, such as the one of the device power states defined by the ACPI specification. In any event, in this lower power consumption mode, voltages are throttled, and/or all or parts of graphics subsystem 40 are powered down and/or selected clocks used by graphics subsystem 40 are slowed.

Once a particular one of graphics subsystem 30, 40 is logically and physically enabled, UMD proxy components 320, 322; and KMD proxy component 324 are provided with an indication of the currently active subsystem, and API/DDI calls for a graphics subsystem are routed to the UMD/KMD components 340, 350, 360 or 342, 352, 362 as appropriate, corresponding to the currently enabled graphics subsystem 30, 40 as described above.

To ensure switch 56 is set properly, BIOS for device 10 can allow the user to select which device should be active at start-up.

Advantageously, configuring switch 56 and graphics subsystem 40 and graphics subsystem 30 as described, reduces power consumption and causes device 10 to consume power required for only one of the two graphics processors thereby reducing overall energy consumption and conserving battery life. For example, portable computers are typically used in a battery operated mode (DC power) by business travellers. The typical usage pattern of such users while travelling will include word processing, presentation and email applications. These applications do not require the heavy duty graphics acceleration that is provided by an external graphics subsystem 40. Transitioning from the use of a second (e.g. external) graphics subsystem 40 to use of a first (e.g. integrated) graphics subsystem 30, having lower average power consumption, aids in balancing between high performance graphics processing and lower power consumption without sacrificing overall system performance.

Figure 10:
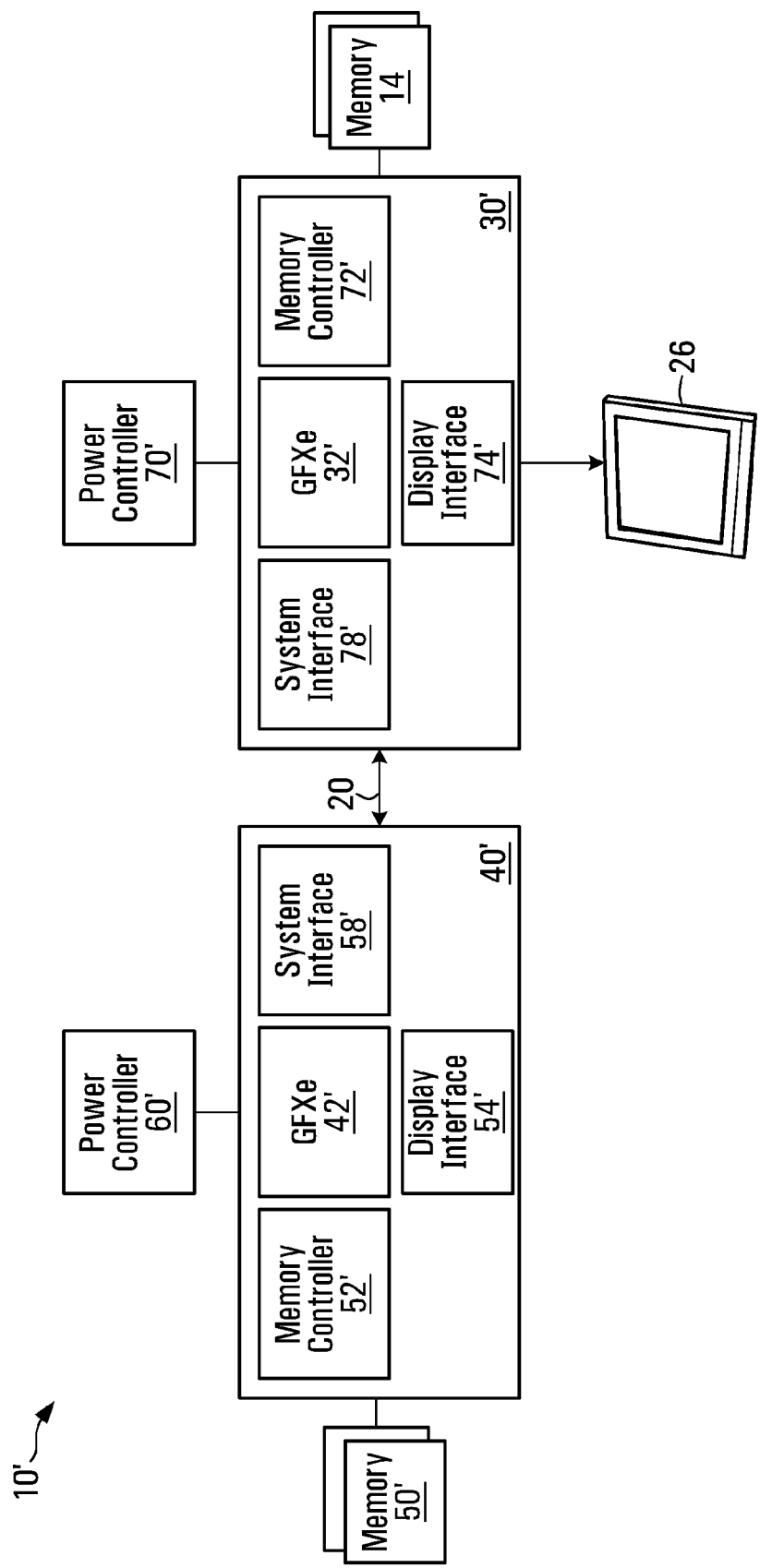
FIG. 10 is a further partial simplified schematic block diagram of portions of a computing device, exemplary of a further embodiment of the present invention.

FIG. 10 is a simplified block diagrams exemplary of a portion of a computing device 10' exemplary of another embodiment of the present invention. Computing device 10' is substantially similar to computing device 10. Components of device 10' that are functionally equivalent to components of device 10 are labelled with a prime (') symbol, and will therefore not be described in detail. Briefly, however, device 10' includes two graphics subsystem 30' and 40'. Again, graphics subsystem 30' includes a graphics engine 32', a memory controller 72', a display interface 74' and a bus interface 78'. A second graphics subsystem 40' is in communication with graphics subsystem 30', by way of high speed bus 20'. Graphics subsystem 40' includes its own graphics engine 42'; memory controller 52'; display interface 54'. Graphics subsystem 40' is further in communication with graphics memory 50'. Notably, device 10' does not include a switch used to control which of graphics subsystem 30' and graphics subsystem 40' is interconnected with display 26'. Instead, and as will become apparent, subsystem 40' is adapted to render graphics to memory 14', across bus 20'.

The organization of software controlling operation of device 10' is similar to that of device 10. However, portions of the software controlling operation of device 10' as device 10' transitions between high and low power consumption states, differ from those of device 10.

Figure 11:
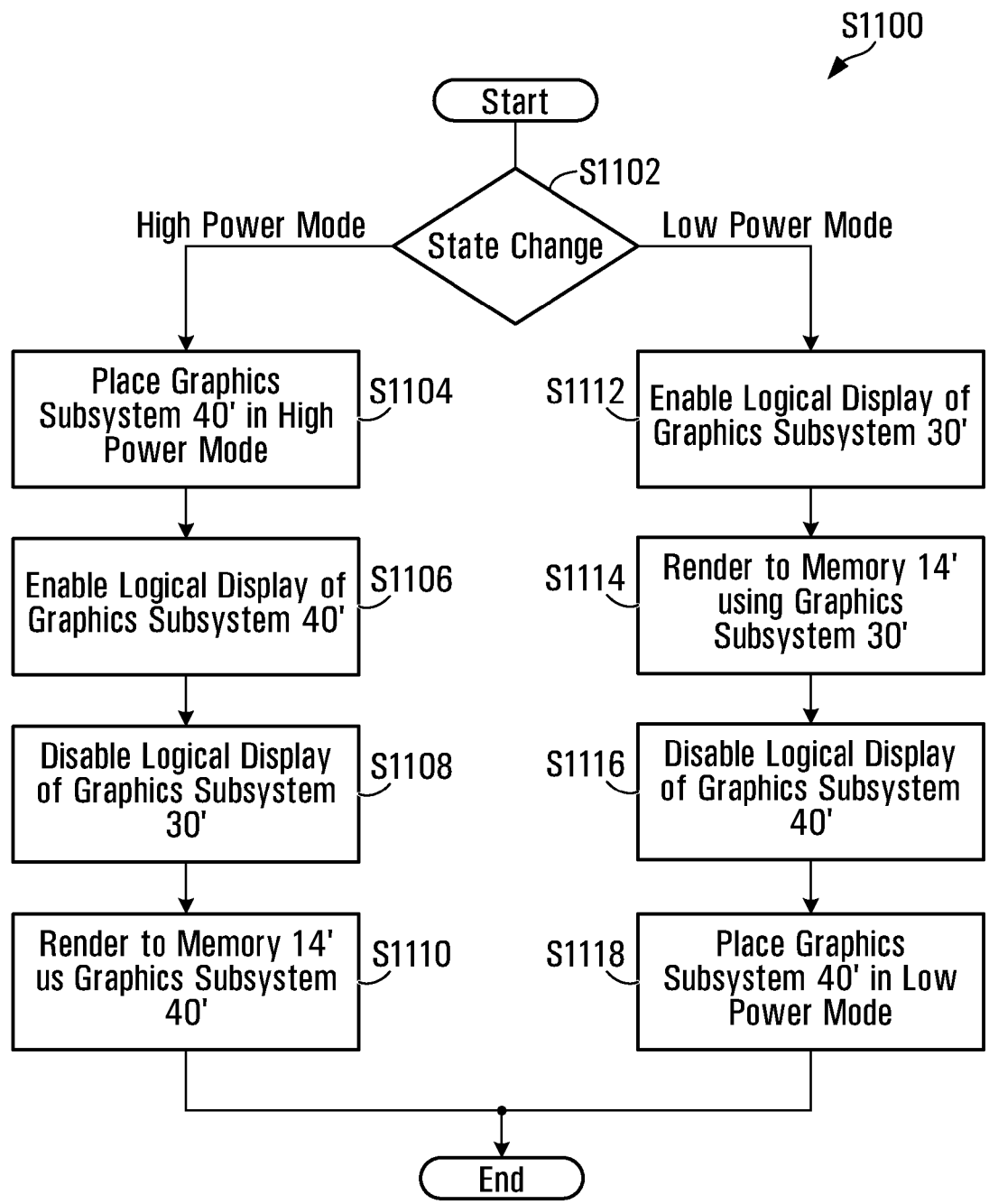
FIG. 11 is a flow chart detailing steps performed by software at the device of FIG. 10, exemplary of embodiments of the present invention.

Specifically FIG. 11 depicts software blocks S1100, exemplary of embodiments of the present invention that may be performed by processor 12' under control of software within system memory of device 10'. Again, blocks S1100 may be performed each time device 10' undergoes a state change, for which subsystems 30' and 40' should be configured accordingly. As illustrated, in block S1102 the software determines whether device 10' should assume its higher power consumption mode, or its lower power consumption mode.

When device 10' is to resume (or transition) to its high power consumption mode, blocks S1104-S1110 are executed. In block S1104 graphics subsystem 40' is placed in its full operational (high power consumption) mode, if it is not already in this mode. This may be performed by providing an appropriate signal to power controller 60', through the driver controlling graphics subsystem 40'. Next, graphics subsystem 40' is enabled in blocks S1106 and S1108. Again, this may be performed by logically disabling any display interconnected associated with graphics subsystem 30' in block S1104, and logically enabling the display connected with graphics subsystem 40', in block S808. Blocks S1106 and S1108 may again be performed, by appropriate operating system API calls, such as the EnumDisplayDevices( ) and ChangeDisplaySettingsEX( ) calls described above, or through direct communication with hardware.

Notably, no physical display is connected to graphics subsystem 40'. In the absence of switch 56 (of device 10—FIG. 4), driver software controlling operation of graphics subsystem 40' is configured to render images in buffer 14' of graphics subsystem 30' instead of within associated memory 50' in block S1110. Conveniently, in the presence of high speed bus 20 (embodied, for example, as the PCIe bus), such rendering is possible across bus 20, owing in part to transfer speeds enabled by the bus.

As well, the driver for graphics subsystem 30' is further configured to cause display interface 74' of graphics subsystem 30' to sample the frame buffer in memory 14', so as to present the image rendered by graphics subsystem 40' in the frame buffer in memory 14' at interconnected display 26'. At the same time, the driver for graphics subsystem 30' may direct graphics engine 32' of graphics subsystem 30' to remain substantially dormant or idle. This mode of operation is schematically depicted in FIG. 12A with only the active blocks of graphics subsystem 40' and graphics subsystem 30', crosshatched.

Figure 12A:
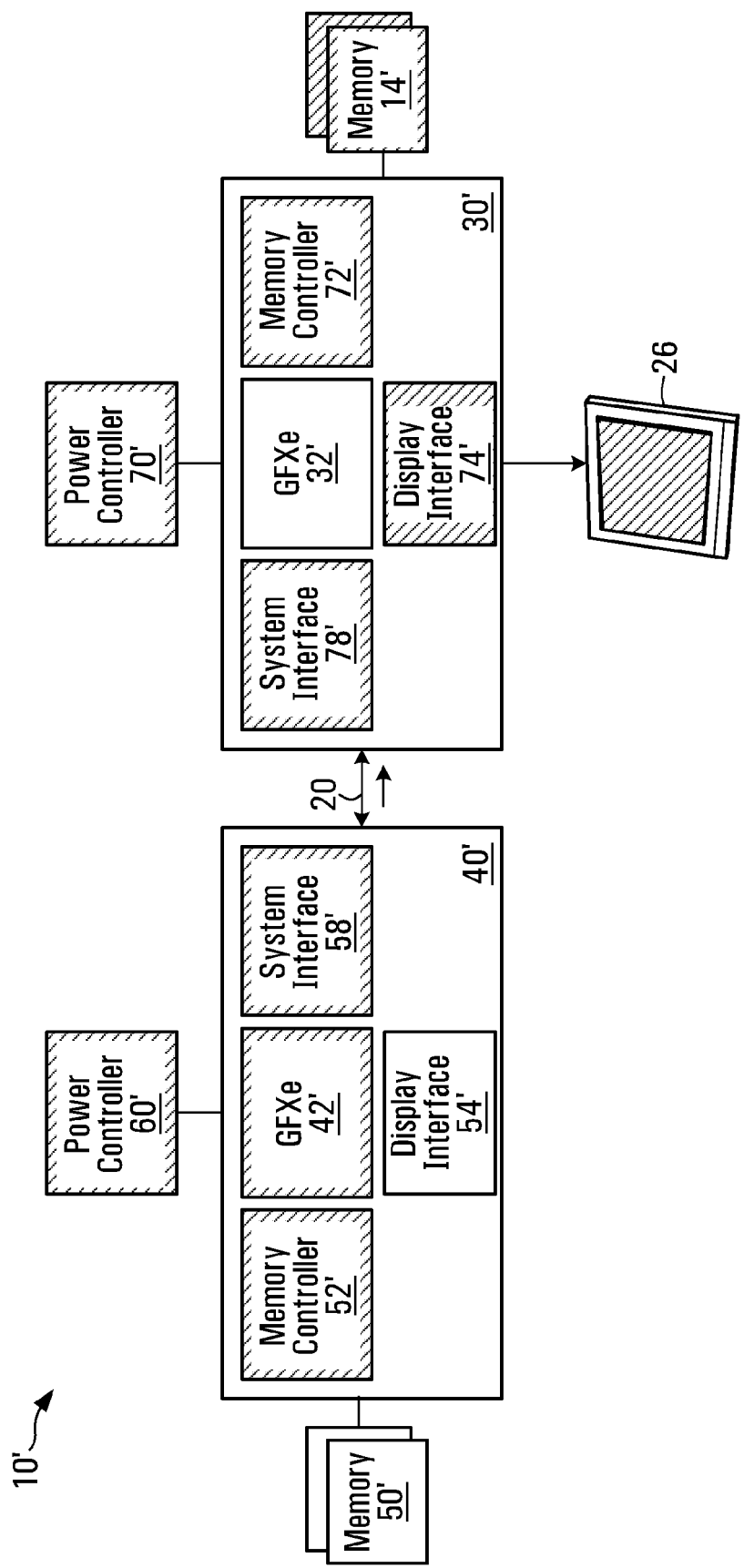
FIGS. 12A and 12B are simplified block diagrams illustrating operation of the device of FIG. 10.

As will be apparent, in the embodiment of FIG. 12A memory 50' and display interface 54' are not used. As such, these functional blocks could be eliminated from subsystem 40' allowing cost reduction. Producing such a graphics subsystem may be beneficial, as subsystem 40' could be produced to complement the functionality provided by subsystem 30'. For example, subsystem could provide a graphics engine 42' that provides 3D graphics or video decoding capabilities. Graphics engine 32' may not include these capabilities. At the same time, 2D graphics abilities offered by graphics engine 32' need not be included in subsystem 40'. Consumers, in turn could add graphics subsystem 30' only when additional functionality is needed.

Figure 12B:
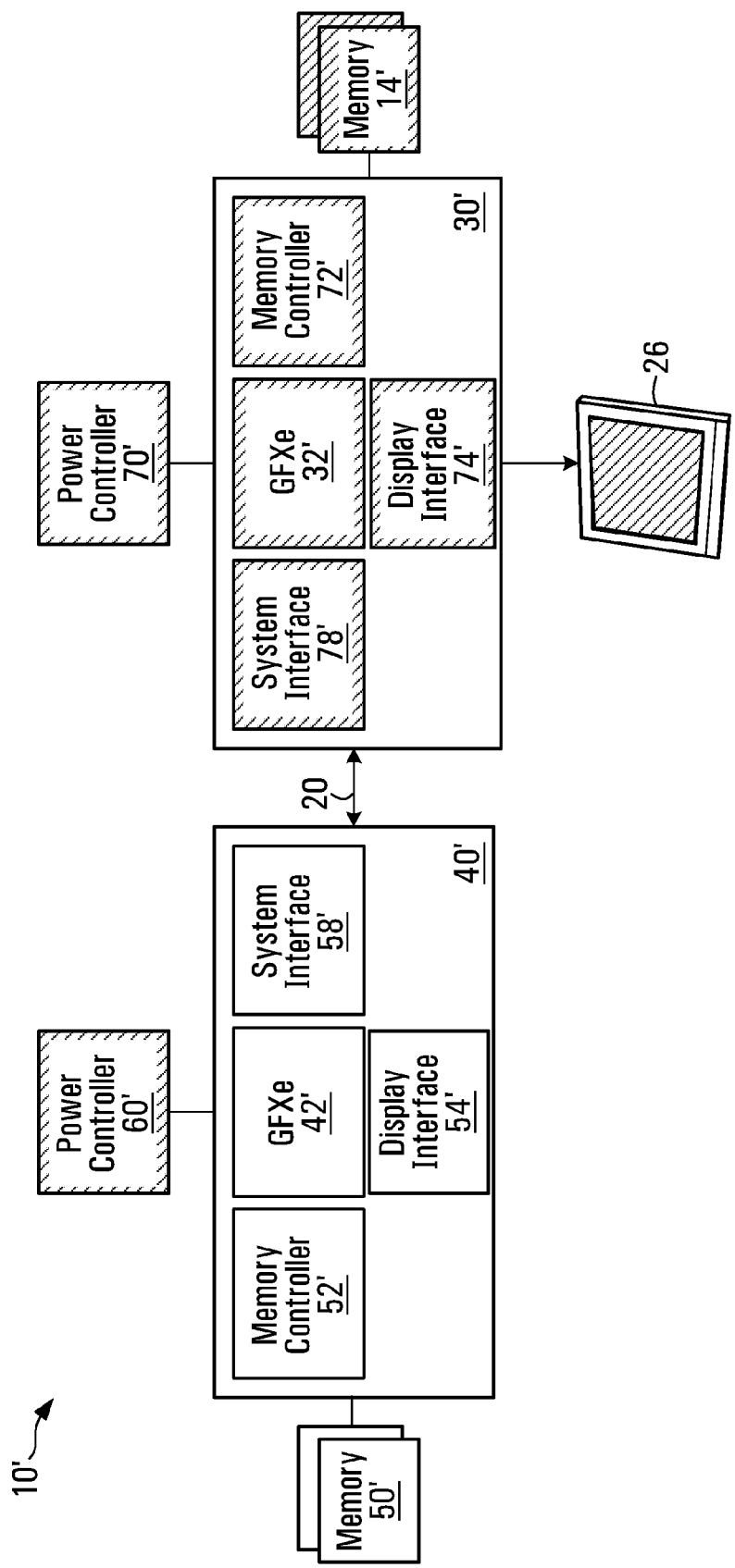

When device 10' is to transition to, or resume its low power consumption mode, blocks S1112-S1118 are executed. Broadly speaking, graphics subsystem 40' is partially or completely disabled and placed in its low power consumption mode, and rendering is again performed by graphics subsystem 30'. To do so, any display interconnected associated with graphics subsystem 30' may be enabled in block S812, and any display physically connected with graphics subsystem 40' may be logically disabled in block S1114. Next, driver software controlling operation of graphics subsystem 30' is again configured to cause graphics subsystem 30' to render images in memory 14'. Display interface 74' continues to sample memory 14' to present images on display 26' interconnected with port 78'. As well, processor 12' first provides a suitable signal to power controller 60' in block S818, placing graphics subsystem 40' in its low power state. In its simplest form, power controller 60' disconnects power to graphics subsystem 40' or places graphics subsystem 40' into a lower power sleep mode. Again, in this lower power consumption mode, voltages are throttled, and/or all or parts of graphics subsystem 40' are powered down and/or selected clocks used by graphics subsystem 40' are slowed. Specifically, the graphics engine 42' of graphics subsystem remains idle or substantially idle (e.g. it may be slowed, disable or powered down). This mode of operation is schematically depicted in FIG. 12B with only the active functional blocks of graphics subsystem 40' and graphics subsystem 30', crosshatched. The inactive/idle functional blocks may be entirely disabled, or operated at reduced voltages or clock speeds.

Optionally, portions of graphics subsystem 30' could be disabled when graphics engine 32' is not in use. This could be facilitated by placing graphics engine 32' and other components on one or more voltage islands that may be disabled by way of a GPIO or similar circuit, any time graphics subsystem 40' is responsible for rendering images.

Other variations should also be apparent. For example, in high power modes depicted in FIG. 12A, both graphics subsystem 30' and graphics subsystem 40' could render to memory 14' or memory 50'. In this way, the two graphics subsystems 30' and 40' may operate in concert, each rendering an alternate frame in memory 14' or rendering a portion of each frame in memory 14'.

In yet other embodiments, additional displays may be connected to graphics subsystems 30' and 40' allowing concurrent use of multiple displays in the high power consumption modes. In this way, display interface 54 could be used to drive a second display. Upon transition to a lower power consumption mode, device 10' could be configured to operate as depicted in FIG. 9B.

Similarly, device 10' (or 10) could include multiple additional graphics subsystems connected to bus 20' (or 20), all of which could be active in the high power consumption mode, and render graphics through display interface 74' of graphics subsystem 30'. Upon transition to the lower power consumption mode, these could be disabled and rendering could be left to graphics engine 32' of graphics subsystem 30'.

Figure 13:
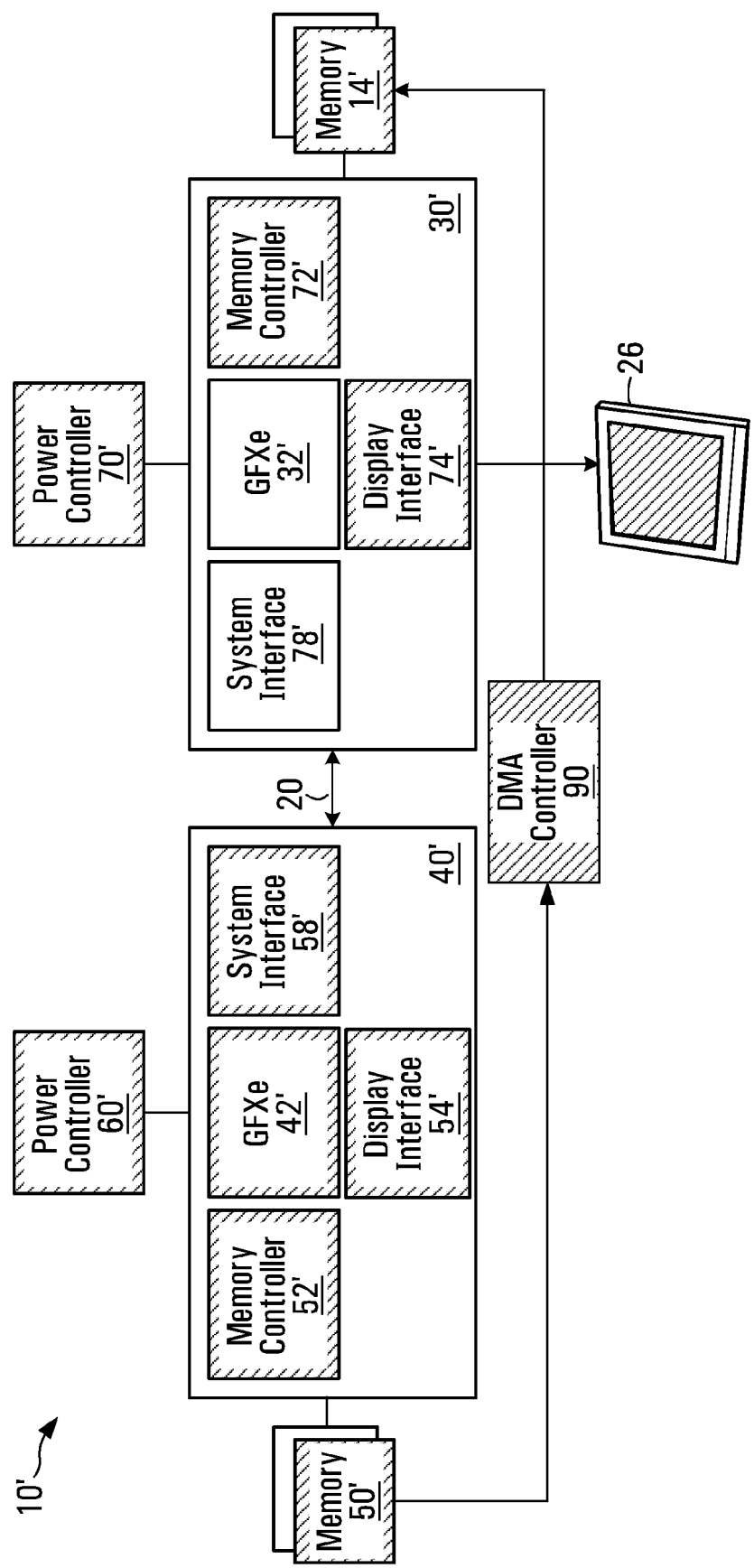
FIG. 13 is a further partial simplified schematic block diagram of portions of a computing device, exemplary of a further embodiment of the present invention.

In yet another embodiment depicted in FIG. 13, computing device 10 may include a direct memory access (DMA) controller 90. DMA controller 90 may transfer data from memory 50' to memory 14'. In this way, in a higher power consumption mode of device 10', graphics subsystem 40' could render images to memory 50'. These rendered images could then be transferred by DMA controller 90 to a frame buffer in memory 14'. DMA controller 90' could form part of graphics subsystem 30' or 40' (for example as DMA engines of graphics engines 32' or 42'), or be otherwise located in computing device 10'. Data may be transferred across bus 20' or otherwise directly from memory 50' to memory 14'. Display interface 74' would continue operating as disclosed above, sampling the frame buffer in memory 14' to present the rendered image on display 26'. Again, active blocks of device 10' of FIG. 13, in its higher power consumption mode are illustrated in crosshatch in FIG. 13.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. An electronic device comprising:
a first graphics subsystem operable to render graphics;
a second graphics subsystem operable to render graphics;
at least one display in communication with at least one of said first graphics subsystem and said second graphics subsystem;
a processor executing, operating system software application software and driver software, said driver software comprising first and second driver components for respectively controlling operation of said first and second graphics subsystem, and a proxy driver component that appears as a single driver to said operating system software, to interface an active one of said first graphics subsystem and said second graphics subsystem with said operating system and said application software, and that routes calls from said application to one of said first and second driver components, in dependence on which of said first and second graphics system is in use.

2. The electronic device of claim 1, wherein said processor executes instructions causing said processor to transition said electronic device from a first mode in which said second graphics subsystem renders graphics on said display, to a second mode in which said first graphics subsystems renders graphics on said display, and said second graphics subsystem is placed in a lower power consumption mode.

3. The electronic device of claim 1, wherein said first and second driver components comprise driver components executing in a user mode of said processor.

4. The electronic device of claim 1, wherein said first and second driver components comprise driver components executing in a kernel mode of said processor.

5. The electronic device of claim 1, wherein which of said first and second graphics system is in use is dependent on a power state of said electronic device.

6. The electronic device of claim 1, wherein said proxy driver component routes calls from an operating system at said device to one of said first and second driver components, in dependence on which of said first and second graphics system is in use.

7. The electronic device of claim 1, wherein said proxy driver component establishes a concordance structure identifying equivalent driver functions in said first and second driver components for performing said routing.

8. An electronic device comprising:
- a first graphics subsystem operable to render graphics;
- a second graphics subsystem operable to render graphics;
- a display in communication with both said first graphics subsystem and said second graphics subsystem;
- a processor executing operating system software, application software and driver software, said driver software comprising
  - first and second user mode driver components for respectively controlling operation of said first and second graphics subsystem, and a user mode proxy driver component that appears as a single user mode driver component to said operating system software, to interface an active one of said first graphics subsystem and said second graphics subsystem with said operating system and said application software, and that routes calls from said application to one of said first and second user mode driver components, in dependence on which of said first and second graphics system is in use;

first and second kernel mode driver components for respectively controlling operation of said first and second graphics subsystem, and a kernel mode proxy driver component that appears as a single kernel mode driver component to said operating system software, to interface an active one of said first graphics subsystems and said second graphics subsystem with said operating system and said application software, and that routes calls from one of said user mode driver components to one of said first and second kernel driver components, in dependence on which of said first and second graphics system is in use.

9. A computer readable medium storing driver software for execution on a computer device comprising, said computing device comprising: a first graphics subsystem operable to render graphics; a second graphics subsystem operable to render graphics; a display in communication with both said first graphics subsystem and said second graphics subsystem; and a processor; said driver software comprising
- a proxy driver component that appears as a single driver component to an operating system of said computing device, to interface an active one of said first graphics subsystem and said second graphics subsystem with said operating system and said application software, and that routes calls from said application to one of first and second driver components, in dependence on which of said first and second graphics system is in use, said first and second driver components for respectively controlling operation of said first and second graphics subsystem.

10. The computer readable medium of claim 9, wherein said proxy driver component establishes a concordance structure identifying equivalent driver functions in said first and second driver components for performing said routing.

11. The computer readable medium of claim 10, wherein said proxy driver component routes calls from said operating system at said device to one of said first and second driver components, in dependence on which of said first and second graphics system is in use.

12. The computer readable medium of claim 9, wherein said first and second driver components comprise driver components executing in a user mode of said processor.

13. The computer readable medium of claim 9, wherein said first and second driver components comprise driver components executing in a kernel mode of said processor.

14. A method of operating an electronic device comprising first and second graphics subsystem operable to render graphics, said method comprising:
- receiving driver calls from a software application or an operating system executing at said electronic device at a proxy driver component that appears as a single driver component to said operating system of said computing device, to interface an active one of said first graphics subsystem and said second graphics subsystem;
- executing said proxy driver to route said driver calls to one of first and second software driver components for respectively controlling operation of said first and second graphics subsystem, in dependence on which of said first and second graphics subsystem is in use.

15. The method of claim 14, further comprising:
- establishing a concordance structure identifying equivalent driver functions in said first and second driver components for performing said routing.

* * * * *